(12) United States Patent
Walker et al.

(10) Patent No.: US 8,670,437 B2
(45) Date of Patent: Mar. 11, 2014

(54) METHODS AND APPARATUS FOR SERVICE ACQUISITION

(75) Inventors: Gordon Kent Walker, Poway, CA (US); Phanikumar Bhamidipati, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 924 days.

(21) Appl. No.: 11/528,303

(22) Filed: Sep. 26, 2006

(65) Prior Publication Data

US 2007/0088971 A1  Apr. 19, 2007

Related U.S. Application Data

(60) Provisional application No. 60/721,565, filed on Sep. 27, 2005, provisional application No. 60/734,962, filed on Nov. 8, 2005, provisional application No. 60/742,189, filed on Dec. 2, 2005.

(51) Int. Cl.
*H04J 3/24* (2006.01)

(52) U.S. Cl.
USPC ........ 370/349; 370/386; 370/391; 375/240.1; 714/10; 714/48; 348/14.01; 348/14.02; 348/14.03; 348/14.04; 348/14.05; 348/14.06; 348/14.07; 725/62; 725/67; 725/68

(58) Field of Classification Search
USPC .......... 714/4, 10, 48, 752; 370/349, 386, 391; 375/240.1; 348/14.01, 14.02, 14.03, 348/14.04, 14.05, 14.06, 14.07; 725/62, 67, 725/68
See application file for complete search history.

(56) References Cited

U.S. PATENT DOCUMENTS

| 5,241,563 | A | * | 8/1993 | Paik et al. ............... 375/262 |
| 5,875,199 | A | * | 2/1999 | Luthi .................... 714/780 |
| 6,057,884 | A | | 5/2000 | Chen et al. |

(Continued)

FOREIGN PATENT DOCUMENTS

| CN | 1278138 | 12/2000 |
| CN | 1478355 | 2/2004 |

(Continued)

OTHER PUBLICATIONS

Bernd Girod, "The information theoretical significance of spatial and temporal masking in video signals," SPIE vol. 1077. Human vision, visual processing, and digital display. pp. 178-187 (1989).

(Continued)

*Primary Examiner* — Khalid Shaheed
(74) *Attorney, Agent, or Firm* — Fulbright & Jaworski LLP

(57) ABSTRACT

Methods and apparatus for service acquisition. In an aspect, a method is provided for service acquisition. The method includes generating one or more channel switch video (CSV) signals associated with one or more multimedia signals, encoding the CSV signals and the multimedia signals to produce error coded blocks, and encapsulating the error coded blocks into a multiplex signal. In an aspect, an apparatus is provided for service acquisition. The apparatus includes a source encoder configured to generate one or more channel switch video (CSV) signals associated with one or more multimedia signals, an error encoder configured to encode the CSV signals and the multimedia signals to produce error coded blocks, and a packer configured to encapsulate the error coded blocks into a multiplex signal.

53 Claims, 19 Drawing Sheets

(56) References Cited

U.S. PATENT DOCUMENTS

| | | | |
|---|---|---|---|
| 6,370,666 B1* | 4/2002 | Lou et al. | 714/751 |
| 6,480,541 B1 | 11/2002 | Girod et al. | |
| 6,535,240 B2 | 3/2003 | Yang et al. | |
| 6,611,561 B1 | 8/2003 | Hannuksela et al. | |
| 7,031,348 B1 | 4/2006 | Gazit | |
| 7,072,366 B2 | 7/2006 | Parkkinen et al. | |
| 7,075,986 B2 | 7/2006 | Girod et al. | |
| 7,085,324 B2* | 8/2006 | Choi et al. | 375/240.27 |
| 7,116,714 B2 | 10/2006 | Hannuksela | |
| 7,369,610 B2 | 5/2008 | Xu et al. | |
| 7,428,639 B2 | 9/2008 | Demos | |
| 7,552,227 B2 | 6/2009 | Wang | |
| 7,606,314 B2 | 10/2009 | Coleman et al. | |
| 8,135,852 B2 | 3/2012 | Nilsson et al. | |
| 8,477,840 B2 | 7/2013 | Yin et al. | |
| 2003/0014752 A1 | 1/2003 | Zaslavsky et al. | |
| 2003/0182610 A1* | 9/2003 | Bushmitch et al. | 714/746 |
| 2004/0066854 A1 | 4/2004 | Hannuksela | |
| 2004/0179139 A1* | 9/2004 | Choi et al. | 348/614 |
| 2004/0181811 A1* | 9/2004 | Rakib | 725/122 |
| 2004/0213473 A1 | 10/2004 | Ohira | |
| 2004/0218816 A1 | 11/2004 | Hannuksela | |
| 2004/0228535 A1 | 11/2004 | Honda et al. | |
| 2004/0243913 A1* | 12/2004 | Budge et al. | 714/776 |
| 2004/0244037 A1* | 12/2004 | Yamaguchi et al. | 725/37 |
| 2005/0163211 A1 | 7/2005 | Shanableh | |
| 2005/0175091 A1 | 8/2005 | Puri et al. | |
| 2005/0185541 A1 | 8/2005 | Neuman | |
| 2005/0185795 A1 | 8/2005 | Song et al. | |
| 2005/0200757 A1* | 9/2005 | Pica et al. | 348/390.1 |
| 2005/0213668 A1 | 9/2005 | Iwabuchi et al. | |
| 2006/0018377 A1 | 1/2006 | Kadono | |
| 2006/0018379 A1 | 1/2006 | Cooper | |
| 2006/0120378 A1* | 6/2006 | Usuki et al. | 370/395.4 |
| 2006/0120448 A1 | 6/2006 | Han et al. | |
| 2006/0146143 A1 | 7/2006 | Xin et al. | |
| 2006/0146934 A1 | 7/2006 | Caglar et al. | |
| 2006/0239299 A1 | 10/2006 | Scheid et al. | |
| 2007/0071100 A1 | 3/2007 | Shi et al. | |
| 2007/0071105 A1 | 3/2007 | Tian et al. | |
| 2007/0073779 A1 | 3/2007 | Walker et al. | |
| 2007/0076796 A1 | 4/2007 | Shi et al. | |
| 2007/0083578 A1 | 4/2007 | Chen et al. | |
| 2007/0101378 A1 | 5/2007 | Jacobs | |
| 2007/0110105 A1* | 5/2007 | Usuki et al. | 370/487 |
| 2007/0153914 A1 | 7/2007 | Hannuksela et al. | |
| 2007/0157248 A1 | 7/2007 | Ellis | |
| 2007/0288959 A1 | 12/2007 | Istvan et al. | |
| 2008/0022335 A1 | 1/2008 | Yousef | |
| 2008/0127258 A1 | 5/2008 | Walker et al. | |
| 2008/0170564 A1 | 7/2008 | Shi et al. | |
| 2008/0196061 A1 | 8/2008 | Boyce | |
| 2009/0222856 A1 | 9/2009 | Kim et al. | |
| 2009/0245393 A1 | 10/2009 | Stein et al. | |
| 2010/0021143 A1 | 1/2010 | Toma et al. | |
| 2010/0153999 A1 | 6/2010 | Yates | |
| 2011/0194842 A1 | 8/2011 | Krakirian | |
| 2012/0294360 A1 | 11/2012 | Walker et al. | |

FOREIGN PATENT DOCUMENTS

| | | |
|---|---|---|
| CN | 1674674 A | 9/2005 |
| CN | 100337480 | 9/2005 |
| CN | 1830164 | 9/2006 |
| EP | 0966162 A1 | 12/1999 |
| EP | 1061737 A1 | 12/2000 |
| EP | 1657835 | 5/2006 |
| EP | 1715680 A1 | 10/2006 |
| EP | 1941738 | 12/2010 |
| JP | 8307786 A | 11/1996 |
| JP | 2004507178 T | 3/2004 |
| JP | 2004289808 A | 10/2004 |
| JP | 2004350263 A | 12/2004 |
| JP | 2006505024 A | 2/2006 |
| JP | 2006527975 A | 12/2006 |
| KR | 20040074365 A | 8/2004 |
| KR | 20040074635 | 8/2004 |
| KR | 20060015757 A | 2/2006 |
| KR | 20060113765 | 2/2006 |
| KR | 20060024416 | 3/2006 |
| KR | 20060087966 A | 8/2006 |
| RU | 2201654 | 3/2003 |
| RU | 2328086 C2 | 6/2008 |
| WO | WO9216071 | 9/1992 |
| WO | WO0167777 | 9/2001 |
| WO | WO0215589 A1 | 2/2002 |
| WO | 03073753 | 9/2003 |
| WO | WO 03098475 A1 | 11/2003 |
| WO | WO2004114667 A1 | 12/2004 |
| WO | WO2004114668 A1 | 12/2004 |
| WO | 20050043783 | 5/2005 |
| WO | 2005067191 | 7/2005 |
| WO | WO2005067191 A1 | 7/2005 |
| WO | WO2005076503 | 8/2005 |
| WO | WO2005106875 A1 | 11/2005 |
| WO | WO2005112465 A1 | 11/2005 |
| WO | WO2006104519 | 10/2006 |
| WO | WO2007042916 | 4/2007 |

OTHER PUBLICATIONS

International Search Report—PCT/US06/037995—International Search Authority, European Patent Office—Mar. 23, 2007.

Written Opinion—PCT/US06/037995—International Search Authority, European Patent Office—Mar. 23, 2007.

International Preliminary Report on Patentability—PCT/US06/037995—The International Bureau of WIPO, Geneva. Switzerland—Apr. 1, 2008.

Bormans J et al: "Video coding with H.264/AVC: tools, perfonnance, and complexity" IEEE Circuits and Systems Magazine, IEEE Service Center, New York, NY, US, vol. 4, No. 1, Jan. 2004, pp. 7-28, XP011111220 ISSN: 1531-636X.

Casoulat, R, et al., "On the Usage of Laser Video for mobile broadcast," Video Standards and Drafts, ISO/IEC JTC1/SC29/WG11, MPEG/M12032, Busan, Apr. 29, 2005, pp. 1-7.

European Search Report—EP10181358 , Search Authority—Munich Patent Office,Jan. 25, 2001(050843EPD1).

Faerber N et al: "Robust H.263 compatible video transmission for mobile access to video servers" Proceeding of the International Conference on Image Processing. ICIP 1997. Oct. 26-29, 1997, vol. 2, Oct. 26, 1997, pp. 73-76, XP002171169.

Huifang Sun et al.: "Error Resilience Video Transcoding for Wireless Communications," IEE Wireless Communications, IEEE Service Center, XP011137995, vol. 12, No. 4, Aug. 2005, pp. 14-21.

Iain Richardson, H.264 and MPEG-4 video coding—next-generation standards, Moscow, Tehnosfera, 2005, pp. 186-197, 220-224.

ITU-T H.264, Series H: Audiovisual and Multimedia System Infrastructure of audiovisual services, Coding of moving video, "Advanced video coding for generic audivisual services," Nov. 2007: 7.3.5.3 Residual Data Syntax; and 9.2 CALVLC parsing process.

Jennehag, U. et al., "Increasing Bandwidth Utilization in Next Generation IPTV Networks," Image Processing, 2004. ICIP '04. 2004 International Conference on Singapore Oct. 24-27, 2004. Piscataway, NJ, USA, IEEE, Oct. 24, 2004, pp. 2075-2078.

Karczewicz M et al.: "The SP- and SI-frame design for H.264/AVC," IEEE Transactions on Circuits and Systems for Video Technology, Jul. 2003, pp. 637-644, vol. 13, No. 7, XP011099256, ISSN: 1051-8215.

Taiwanese Search report—095135825—TIPO—Aug. 19, 2010.

TIA-1099 Standard "Forward Link Only Air Interface Specificaiton for Terrestrial Mobile Multimedia Multicast" pp. 1-341, Mar. 2007.

Translation of Office Action in Japan application 2008-533617 corresponding to U.S. Appl. No. 11/527,306, citing JP2004350263 and JP2004507178 dated Feb. 1, 2011 (050843JP).

Wiegand T: "H.264/AVC Video Coding Standard", Berlin, Germany, May 2003.

Taiwan Search Report—TW095135825—TIPO—Oct. 2, 2012.

* cited by examiner

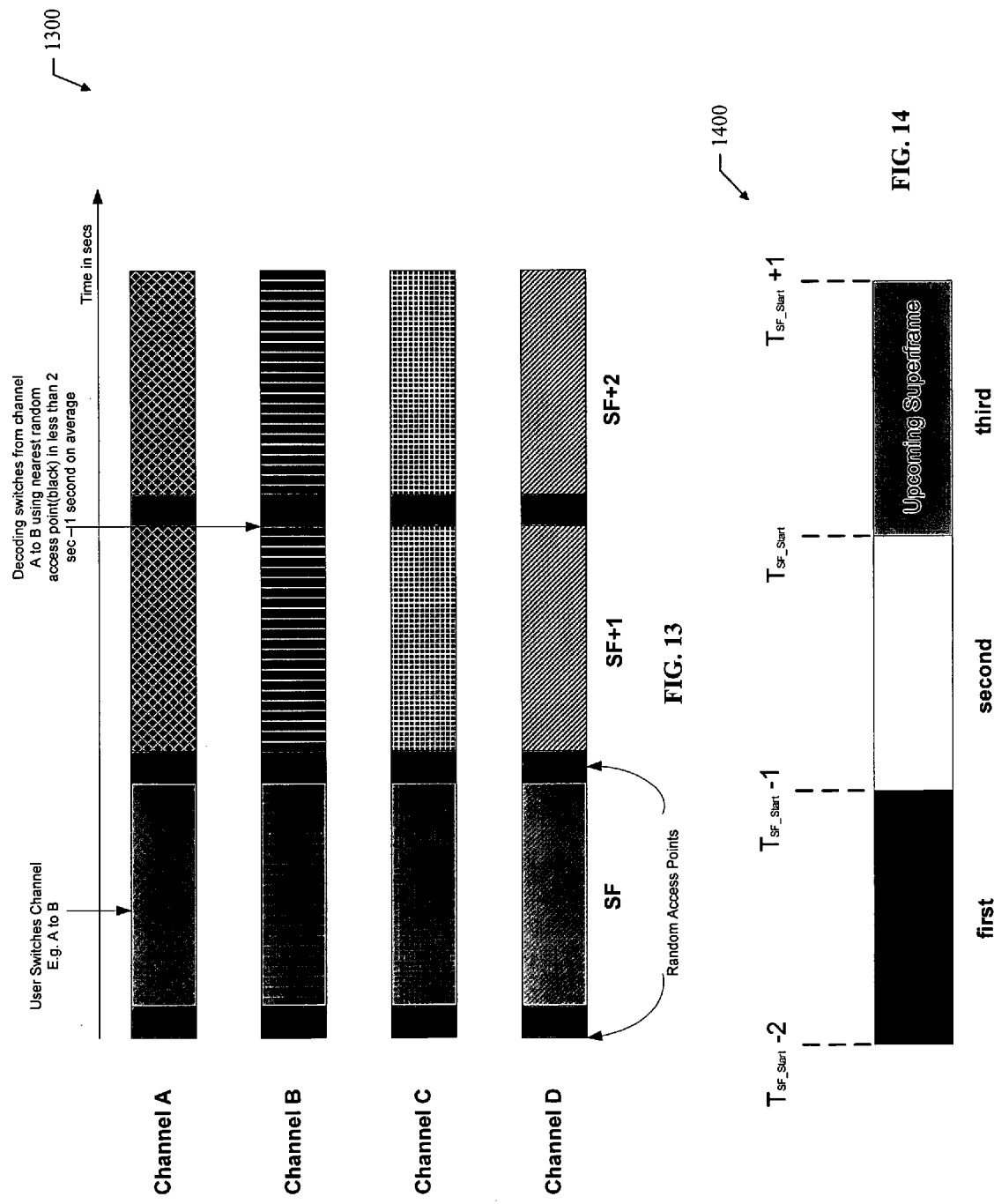

FIG. 15

| Enh. Layer | $I'_1$ | $P'_3$ | $B_2$ | $P'_5$ | $B_4$ | $P'_7$ | $B_6$ | $P'_9$ | $B_8$ | $P'_{11}$ | $B_{10}$ | $P'_{13}$ | $B_{12}$ | $P'_{15}$ | $B_{14}$ | $P'_{17}$ | $B_{16}$ | $P'_{19}$ | $B_{18}$ | $P'_{21}$ | $B_{20}$ | $P'_{23}$ | $B_{22}$ | $P'_{25}$ | $B_{24}$ | $P'_{27}$ | $B_{26}$ | $P'_{30}$ | $B_{28}$ | $B_{29}$ |
|---|---|---|---|---|---|---|---|---|---|---|---|---|---|---|---|---|---|---|---|---|---|---|---|---|---|---|---|---|---|---|
| Base Layer | $I_1$ | $P_3$ | | $P_5$ | | $P_7$ | | $P_9$ | | $P_{11}$ | | $P_{13}$ | | $P_{15}$ | | $P_{17}$ | | $P_{19}$ | | $P_{21}$ | | $P_{23}$ | | $P_{25}$ | | $P_{27}$ | | $P_{30}$ | | |

1500

METHODS AND APPARATUS FOR SERVICE ACQUISITION

CLAIM OF PRIORITY UNDER 35 U.S.C. §119

The present Application for Patent claims priority to Provisional Application Ser. No. 60/721,565, entitled "Method and Apparatus for Fast Channel Switching for Multimedia Broadcast Applications," filed Sep. 27, 2005, and assigned to the assignee hereof and hereby expressly incorporated by reference herein.

The present Application for Patent claims priority to Provisional Application Ser. No. 60/734,962, entitled "Methods And Apparatus For Service Acquisition" filed Nov. 8, 2005, and assigned to the assignee hereof and hereby expressly incorporated by reference herein.

The present Application for Patent claims priority to Provisional Application Ser. No. 60/742,189, entitled "Integrated Codec And Physical Layer For Efficient Multimedia Streaming" filed Dec. 2, 2005, and assigned to the assignee hereof and hereby expressly incorporated by reference herein.

BACKGROUND

1. Field

The present Application relates generally to the operation of multimedia transmission systems, and more particularly, to methods and apparatus for providing fast service acquisition.

2. Background

In current content delivery/media distribution systems, when an application involves the transmission of a multiplex of compressed media (video and audio) where a receiver tunes to one of the channels in the multiplex, the latency in switching between channels is key to the user's experience. For example, in a conventional multimedia broadcast system, a multimedia server consists of a bank of source encoders that compress individual pieces of media that feed into a multiplexer, which consolidates the compressed media into a single multiplexed stream. The broadcast server communicates the compressed content to a broadcast receiver over a broadcast network, which could be heterogeneous in nature and error-prone. The broadcast receiver receives at least a portion of the multiplex and a de-multiplexer extracts the media of interest. Typically, there is a client application that enables "tuning" to the media channel/program of interest. This may or may not be through user intervention.

When the source is video, channel switching is possible only at random access points (RAPs) in the compressed/coded video bitstream. These RAPs comprise intra-frames (I-frames that are independently decodable) or through progressive I-frames (which are I-blocks that are distributed over more than one video frame). The channel switching time depends on the frequency of such random access points, which is typically between 2-10 seconds (since RAPs increase the average bit rate and hence transmission bandwidth of the coded video bitstream).

Random access through I-frames and distributed I-frames for progressive intra refreshes as proposed in industry standard H.264 are the most popular approaches thus far to service acquisition at the cost of quality and bandwidth. Switching latencies in these cases are on the order of a few seconds.

In some systems channel switching and trick play (step through, fast forward, rewind) are enabled through intra frames placed/coded periodically and as often as appropriate in video streams. However, I-frames increase the bit-rate and bandwidth of the video streams significantly. Hence the frequency of I-frames is typically from one second to ten seconds in typical applications. This implies that a channel switch can, at best, occur in one second (when all required conditions are met, for example, channel switching was enabled just before an I-frame and the buffer has just refreshed.

Progressive intra refresh enables channel switching in an incremental fashion. The prediction needs to be controlled such that a complete frame is refreshed in a pre-determined duration. In this case, channel switching includes latency equal to this duration in addition to latencies induced by buffer depths and switching at lower layers.

Thus, for example, if a device is receiving a multiplex that contains one hundred compressed media channels and the device user wishes to switch between channels, conventional system may take between 1-10 seconds to perform each channel switch. The time for each channel switch is generally dependant on when in the transmission frame the switch request occurs. Thus, device users experience long and varying delay times when switching between channels, which can be frustrating and result in an unsatisfactory user experience.

Therefore, what is needed is a system that operates to provide fast service acquisition and/or switching between services in a multiplex.

SUMMARY

In one or more aspects, a service acquisition system is provided, comprising methods and apparatus that operate to provide fast service acquisition and channel switching in a multiplex. For example, channel switching may occur in response to a user input, or in response to an interactive service. For example, an interactive channel redirection may cause a new service or channel to be acquired. Alternatively, a user input triggers a new service or channel to be acquired. In an aspect, multimedia services and non-multimedia services may be interactively acquired.

In an aspect, a method is provided for service acquisition. The method comprises generating one or more channel switch video (CSV) signals associated with one or more multimedia signals, encoding the CSV signals and the multimedia signals to produce error coded blocks, and encapsulating the error coded blocks into a multiplex signal.

In an aspect, an apparatus is provided for service acquisition. The apparatus comprises a source encoder configured to generate one or more channel switch video (CSV) signals associated with one or more multimedia signals, an error encoder configured to encode the CSV signals and the multimedia signals to produce error coded blocks, and a packer configured to encapsulate the error coded blocks into a multiplex signal.

In an aspect, an apparatus is provided for service acquisition. The apparatus comprises means for generating one or more channel switch video (CSV) signals associated with one or more multimedia signals, means for encoding the CSV signals and the multimedia signals to produce error coded blocks, and means for encapsulating the error coded blocks into a multiplex signal.

In an aspect, a machine-readable medium is provided that comprises instructions for service acquisition. The instructions upon execution cause a machine to generate one or more channel switch video (CSV) signals associated with one or more multimedia signals, encode the CSV signals and the multimedia signals to produce error coded blocks, and encapsulate the error coded blocks into a multiplex signal.

In an aspect, at least one processor is provided for service acquisition. The at least one processor being configured to generate one or more channel switch video (CSV) signals associated with one or more multimedia signals, encode the CSV signals and the multimedia signals to produce error coded blocks, and encapsulate the error coded blocks into a multiplex signal.

In an aspect, a method is provided for service acquisition. The method comprise receiving a multiplex signal associated with a plurality of channels, detecting a selection of one of the channels, decoding a channel switch video (CSV) signal associated with the selected channel, and rendering the CSV signal.

In an aspect, an apparatus is provided for service acquisition. The apparatus comprises a receiver configured to receive a multiplex signal associated with a plurality of channels, selection logic configured to detect a selection of one of the channels, an un-packer configured to decode a channel switch video (CSV) signal associated with the selected channel, and source decoder configured to render the CSV signal.

In an aspect, an apparatus is provided for service acquisition. The apparatus comprises means for receiving a multiplex signal associated with a plurality of channels, means for detecting a selection of one of the channels, means for decoding a channel switch video (CSV) signal associated with the selected channel, and means for rendering the CSV signal.

In an aspect, a machine-readable medium is provided that comprises instructions for service acquisition. The instructions upon execution cause a machine to receive a multiplex signal associated with a plurality of channels, detect a selection of one of the channels, decode a channel switch video (CSV) signal associated with the selected channel, and render the CSV signal.

In an aspect, at least one processor is provided for service acquisition. The at least one processor being configured to receive a multiplex signal associated with a plurality of channels, detect a selection of one of the channels, decode a channel switch video (CSV) signal associated with the selected channel, and render the CSV signal.

In an aspect, a method is provided for service acquisition. The method comprises constructing a plurality of transmission frames where each transmission frame represents a selected time interval, and encoding one or more channels of data into the plurality of transmission frames, wherein selected data is encoded into predetermined transmission frames so that channel jitter can be absorbed using a single buffer having a selected time duration.

In an aspect, an apparatus is provided for service acquisition. The apparatus comprises means for constructing a plurality of transmission frames where each transmission frame represents a selected time interval, and means for encoding one or more channels of data into the plurality of transmission frames, wherein selected data is encoded into predetermined transmission frames so that channel jitter can be absorbed using a single buffer having a selected time duration.

In an aspect, a method is provided for service acquisition. The method comprises receiving a plurality of transmission frames wherein each transmission frame represents a selected time interval and comprises one or more channels of data, and wherein selected data is encoded into predetermined transmission frames. The method also comprises buffering the plurality of transmission frames with a single buffer having a selected time duration, wherein channel jitter is absorbed.

In an aspect, an apparatus is provided for service acquisition. The apparatus comprises means for receiving a plurality of transmission frames wherein each transmission frame represents a selected time interval and comprises one or more channels of data, and wherein selected data is encoded into predetermined transmission frames. The apparatus also comprises means for buffering the plurality of transmission frames with a single buffer having a selected time duration, wherein channel jitter is absorbed.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following description when taken in conjunction with the accompanying drawings wherein:

FIG. 13 shows a diagram that illustrates fast channel switching;provided by aspects of a service acquisition system;

FIG. 14 shows a diagram that illustrates the flow of T-packets in aspects of a service acquisition system;

FIG. 15 shows a diagram that illustrates a video frame arrangement in an aspect of a T-packet;

DESCRIPTION

The following description describes aspects of a service acquisition system for acquisition and switching between channels of a multimedia multiplex (i.e., early entry/fast tuning). The system is especially well suited for use with virtually any type of device that operates to receive a multimedia multiplex. For example, such devices include but are not limited to, portable telephones, PDAs, email devices, notebook computers, tablet computers or any other type of receiving device. Furthermore, aspects of the system may be used in any type of network environment, including but not limited to, communication networks, content distribution networks, public networks, such as the Internet, private networks, such as virtual private networks (VPN), local area networks, wide area networks, long haul networks, or any other type of data or communication network.

For the purpose of this description, aspects of a service acquisition system are described with reference to switching between channels of a multimedia multiplex that comprises a sequence of superframes where each superframe comprises four frames of data. However, aspects of the service acquisition system are not limited to this superframe structure and are equally applicable to provide service acquisition for other types of multiplex structures.

For the purpose of this description, the service acquisition system is described with reference to implementations using an open system interconnection (OSI) model. For example, various aspects are described with reference to implementation at one or more layers of the OSI model. However, aspects of the service acquisition system are not limited to this implementation, and may be implemented using any other type of hardware/software structure, configuration, or communication model.

Overview

Figure 1:
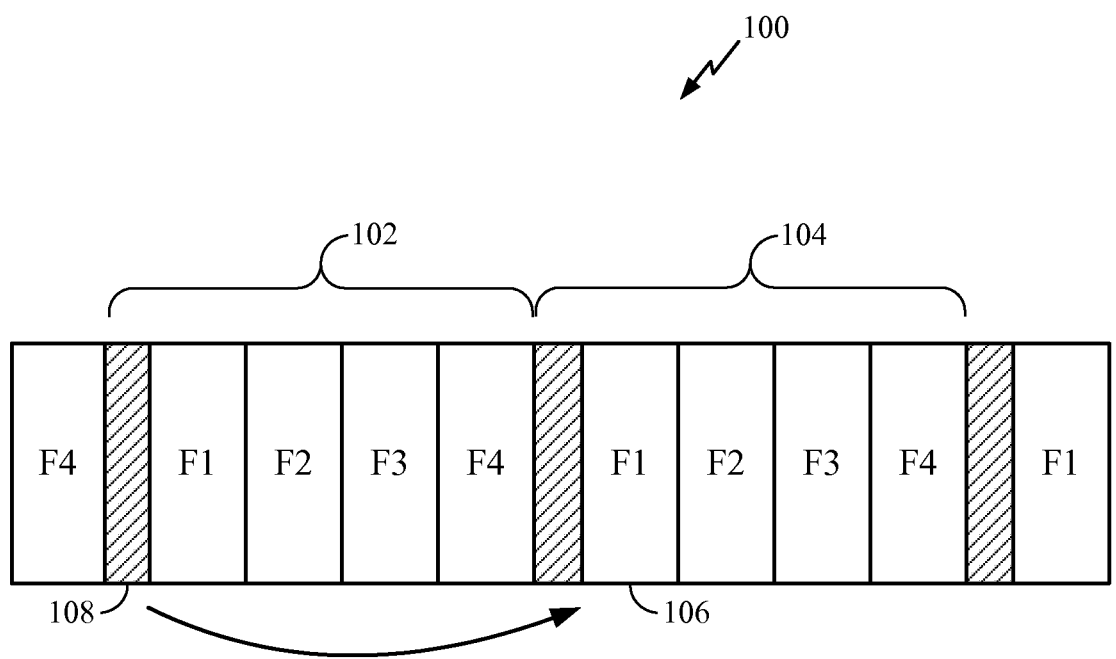
FIG. 1 shows an aspect of a transmission stream that comprises a sequence of superframes that are used to transport a multimedia multiplex.

FIG. 1 shows an aspect of a transmission stream 100 that comprises a sequence of superframes in a multimedia multiplex. Each superframe (102, 104) comprises four frames 106 and overhead information symbols (OIS) 108. It should be noted that the OIS symbols 108 associated with each superframe comprises information necessary for the decoding/tuning of an associated superframe. Thus, the OIS 108 is applicable to superframe 104.

In one or more aspects, the service acquisition system operates to allow a receiver to receive the multimedia multiplex and perform fast acquisition and switching between channels in the multiplex. For example, the system allows fast channel switching to occur in the middle of a superframe and utilizes any partial data received during that superframe for the new channel. The partial data referred to is the data retrieved from the last three or less of the four frames present in the superframe during which the switch occurred. This results in reduced acquisition latency on the device since the device can utilize the partial data.

In aspects of the service acquisition system, a broadcast server operates to re-arrange application data transmitted in a superframe in a way that satisfies the following.

1. The application data (e.g. Video frames) in an individual frame of a superframe is decodable without any dependency on the data in other frames of the previous superframe. (Application Layer)
2. The result of Reed Solomon (RS) sequencing performed at the MAC layer should have no effect on the contiguity of the Real Time application data. That is, the application data that can fit in a frame is not dispersed across multiple frames in the superframe and maintains its contiguous nature. (MAC Layer)
3. The most important information (for example working keys) along with the Real Time application data is pushed as far back in the frames as possible. That is, any MAC layer packets containing padding octets are present at the start of the superframe followed by the application data (Stream 1 or 2) and then the Stream 0 data. This will ensure that a receiver always has an opportunity to get the important information carried on stream 0, as long as some application data has been retrieved before an Early Entry/Fast tuning trigger. (Stream and MAC Layer)
4. Stream layer octet interleaving is eliminated to prevent dispersing the application data (Stream layer)

In aspects of the service acquisition system, a receiving device operates to ensure that OIS information is available for the superframe in which Early Entry/Fast tuning is performed.

Modifications to Conventional Systems

Figure 2:
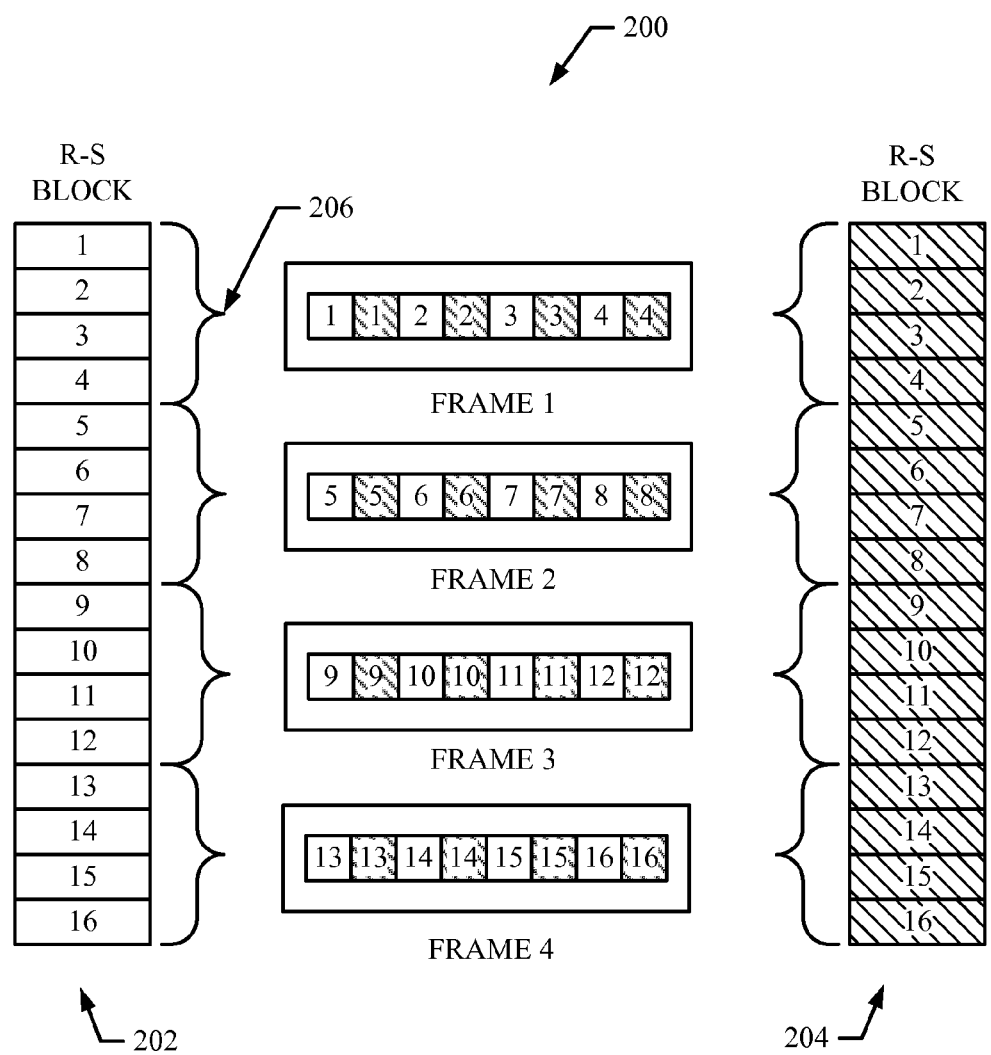
FIG. 2 shows an illustration of RS sequencing.

FIG. 2 shows an illustration of RS sequencing 200. In a typical implementation, the MAC layer of the AIS stack takes MAC layer capsule data (multiple RS code blocks) and disperses them as across a superframe. This procedure is known as RS sequencing and is executed for all RS code blocks. For example, 16 MAC layer packets in each of the RS code blocks (202, 204) are distributed equally across four frames (i.e., 4 MAC Layer packets each).

The fragment of an RS code block in a frame containing four MAC layer packets is referred to as an RS sub-block 206. Within a frame, each RS sub-block is interleaved with the sub-blocks from other RS code blocks. For example, if there are two RS code blocks (102, 104) in a superframe, each frame contains the following in the order specified:

1. First MAC layer packet from a sub-block of first RS code block.
2. First MAC layer packet from the corresponding sub-block from second RS code block.
3. Second MAC layer packet from the same sub-block of first RS code block.
4. Second MAC layer packet from the corresponding sub-block of second RS code block.
5. And so on, till the fourth MAC packet.

The data delivered by the Real Time application is processed in a contiguous fashion by the stream layer of the AIS stack and during MAC Layer capsule formation. This contiguous nature changes when the RS code blocks containing the application data are dispersed across the superframe to achieve time diversity gains that provides better RS coding performance.

Any contiguous application data (for example, video-frame data that occupies a single frame worth of data) is dispersed among more than one frame by the MAC Layer sequencing of RS code blocks. The receiver has to wait for more than one frame to gather application data that when assembled in a contiguous arrangement is less than a frame worth of data.

In one or more aspects, the service acquisition system operates to allow a device to extract as much real time data as quickly as possible within a single frame. To achieve this it is desirable that the real time application data maintain its contiguous nature while sent over the four frames of a superframe.

Service Acquisition

In aspects of a service acquisition system, application data is pre-interleaved by the Data Channel MAC protocol to nullify the effects of MAC Layer RS code block sequencing as follows. In an aspect, all the streams in the super frame undergo this pre-interleaving for uniformity of implementation. In an aspect, the following pre-interleaving functions are performed.

1. Data Channel MAC Protocol allocates a pre-interleaving buffer every superframe of size (NumRSCodeBlocks*K*122) octets, where a. "NumR-SCodeBlocks" is the number of RS Error Control Blocks present in the Data Channel MAC layer capsule for that superframe.
b. K specifies the number of data octets in the RS code word. For example, outer-code rate of 12/16 has a K of 12.
2. This buffer is formatted into a table having "NumR-SCodeBlocks" columns and 'K' rows. Thus, each cell of this table is 122 octets long.
3. The protocol starts to fill in the pre-interleaving buffer with MAC layer packets row-wise starting with the padding MAC layer packets first, followed by the MAC layer packets carrying stream 2 data, stream 1 data and stream 0 being the last.
4. Each column thus forms the top 'K' rows of an error control block.
5. RS parity octets are added for each column formed above followed by RS sequencing before delivering it to the Physical Layer.

Thus, by pre-interleaving it is possible to maintain the contiguous nature of the application data within each frame of a superframe.

Channel Switch Version (CVS)

In one or more aspects, the service acquisition system operates to encode a channel switch version (CSV) of the media in addition to normal encoding, and transmits this CSV data either in-band or out-of-band. In an aspect, the CSV is a down-sample lower frame rate version of the video under consideration. It should be noted that similar versions can be coded for other media types, such as audio, data, etc. depending on the application. Aspects of the CSV generation may also be utilized by other applications that may include use of the CSV version (or parts of it) for error recovery, error concealment, and error control (i.e., stopping accumulation of prediction and channel errors).

The following description pertains to video broadcast application data and associated video compression algorithms. The channel switch version of the video application data is an independently decodable piece of data that is transmitted periodically to provide random access into the coded video bitstream (in addition to I-frames or distributed I-frames). When a change in the media of interest in a multiplex is requested at a receiving device, the request is communicated to the application layer, which then starts to decode the CSV. This operation is instantaneous since the CSV can be inserted at the switch points dictated by the transport and physical layer protocols. The media then resumes to full quality at the next random access point. As a result, the device user experiences a fast channel switch.

Figure 3:
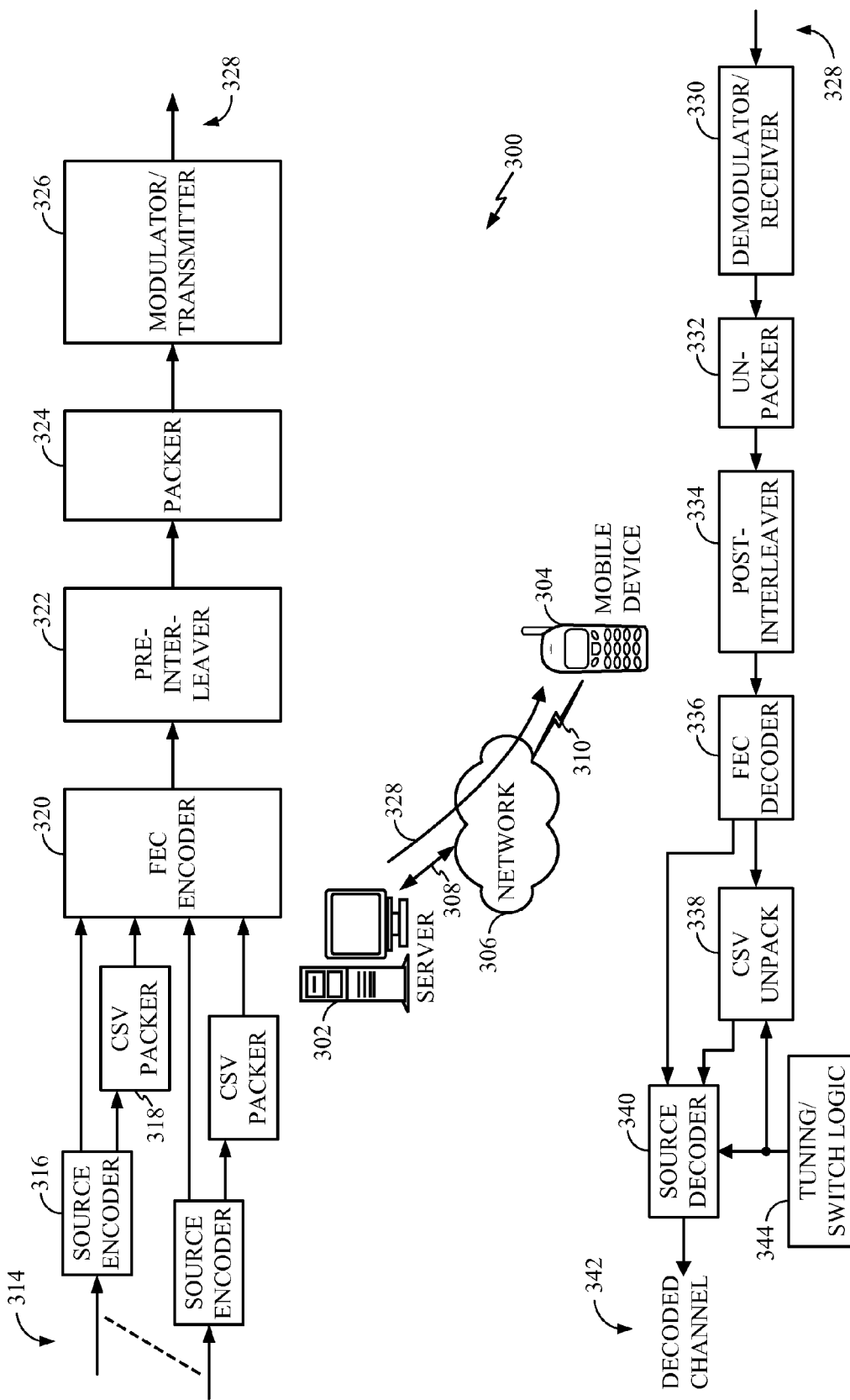
FIG. 3 shows a network that comprises an aspect of a service acquisition system.

FIG. 3 shows a network 300 that comprises an aspect of a service acquisition system. The network 300 comprises a broadcast server 302 that operates to broadcast a multimedia multiplex to a device 304 using a network 306. The server 302 communicates with the network 306 through communication link 308 that comprises any suitable type of wired and/or wireless communication link. The network 306 communicates with the device 304 through communication link 310 that in this aspect comprises any suitable type of wireless communication link. For example, the communication link 310 may comprise an orthogonal frequency division multiplex (OFDM) communication link known in the telecommunication industry.

The device 304 is a mobile telephone but may comprise any suitable device, such as a PDA, email device, pager, notebook computer, tablet computer, desktop computer or any other suitable device that operates to receive a multimedia multiplex signal.

In an aspect of the service acquisition system, the server 302 comprises source encoders 316 that operate to receive input video signals 314. In an aspect, 256 input video signals are input to 256 source encoders 316. However, aspects of the system are suitable for use with any number of input video signals and corresponding source encoders.

Each of the source encoders 316 produces an encoded signal that is input to a forward error correction (FEC) encoder 320. Each of the source encoders 316 also produces a channel switch video signal that is input to a CSV packer 318. The CSV signal is a low resolution independently decodable version of a corresponding input signal. A more detailed description of the CVS signal is provided in another section of this document. The CSV packers 318 operate to pack (or encapsulate) the CSV signals and outputs encapsulated CVS signals to the FEC encoder 320.

The FEC encoder 320 operates to error encode the signals received from the source encoders 316 and the CSV packers 318 to produce error encoded blocks that are input to a pre-interleaver 322. In an aspect, the FEC encoder 320 provides RS coding. The pre-interleaver 322 arranges the error encoded blocks so that selected blocks appear at predetermined locations in a transmission frame after the operation of a packer 324. For example, the pre-interleaver 322 operates to perform the functions described above to maintain the continuous nature of the application data in the generated transmission frames. As a result, the pre-interleaver 322 operates to arrange the error coded blocks so that they are optimized to provide fast service acquisition.

The packer 324 operates to encapsulate the output of the pre-interleaver 322 into a transmission frame. The operation of the pre-interleaver 322 enables fast service acquisition because it positions the CSV and other important frame information at strategic locations in the transmission frame so that fast service acquisition can occur. A more detailed description of the pre-interleaver process is provided in another section of this document.

The output of the packer 324 is a transmission frame that is input to a modulator/transmitter 326 that operates to transmit a modulated transmission frame 328 over the network 306. For example, the modulated transmission frame 328 is transmitted from the server 302 to the device 304 using the network 306. The transmission frame 328 comprises a sequence of superframes where each superframe comprises four frames.

At the receiving device 304, the modulated transmission frame 328 is received by a demodulator/receiver 330 that outputs the received transmission frame to un-packer 332. In an aspect, the demodulator/receiver 330 comprises a single buffer 344 having a finite time duration that operates to absorb channel jitter and support outer FEC decoding. The un-packer 332 operates to undo the encapsulation process performed by the packer 324. The output of the un-packer 332 is input to a post-interleaver 334 that operates to de-interleave the received information to produce FEC error encoded blocks.

The FEC error encoded blocks are input to a FEC decoder 336 that decodes the blocks and outputs the decoded information to CSV un-packer 338 and source decoder 340. The CSV un-packer 338 operates to unpack the CSV signal for a particular channel. The source decoder 340 operates to decode a particular channel. The tuning/channel switch logic 344 outputs control signals to the source decoder 340 and CSV un-packer 338 to control which channel of the received multiplex is decoded by the source decoder 340 and output as decoded channel 342.

In one or more aspects, the tuning/channel switch logic 344 is triggered by user input or by any other activity occurring at the device 304. When a channel switch is requested by a user, the tuning/channel switch logic 344 operates to tune the source decoder 340 to the selected channel and corresponding CSV information. The source decoder 340 operates to decode the CSV information to produce a low-resolution version of the selected new channel for display to the device user. In the meantime, the source decoder 340 begins decoding information from the transmission frame for the selected new channel. This process is facilitated by the strategic arrangement of the error coded blocks provided by the pre-interleaver 322. Thus, aspects of the service acquisition system operate to provide CSV signals and pre-interleaving to facilitate fast channel switching at a receiving device.

Figure 4:
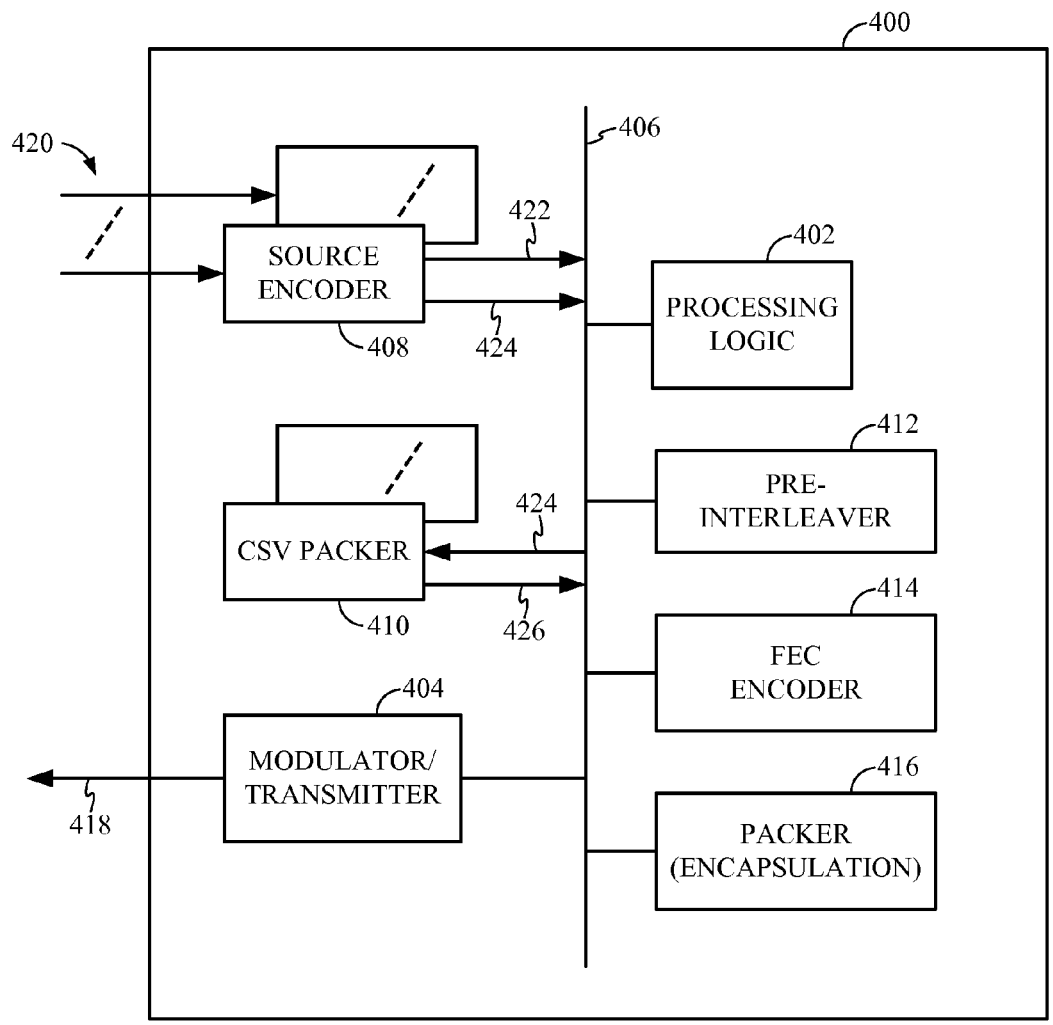
FIG. 4 shows a server for use in aspects of a service acquisition system.

FIG. 4 shows a server 400 for use in aspects of a service acquisition system. For example, the server 400 is suitable for use as the server 302 shown in FIG. 3. The server 400 comprises processing logic 402 and modulator/transmitter logic 404, which are coupled to a data bus 406. The server 400 also comprises source encoders 408, CVS packers 410, pre-interleaver logic 412, FEC encoder 414, and packer 416, which are also coupled to the data bus 406.

In one or more aspects, the processing logic 402 comprises a CPU, processor, gate array, hardware logic, memory elements, virtual machine, software, and/or any combination of hardware and software. Thus, the processing logic 402 generally comprises logic to execute machine-readable instructions and to control one or more other functional elements of the server 400 via the internal data bus 406.

The modulator/transmitter logic 404 comprises hardware logic and/or software that operate to allow the server 400 to transmit a multimedia multiplex over a data network for reception by one or more receiving devices. In an aspect, the modulator/transmitter logic 404 comprises a communication channel 418. For example, in an aspect, the communication channel 418 comprises a broadcast channel configured to allow the server 400 to broadcast a multimedia multiplex.

The source encoders 408 comprise any number or type of source encoders that operate to receive corresponding input multimedia streams 420 to produce source encoded streams 422 and CSV information 424. For example, in an aspect, the CVS information 424 comprises low-resolution independently decodable versions of the input multimedia streams 420. A more detailed description of the CSV information 424 is provided in another section of this document.

The CVS packers 410 comprise any combination of hardware and software that operates to pack or encapsulate the CSV information 424. As a result, encapsulated CVS information 426 is produced. In an aspect, the CSV information 424 is packed for delivery as an in-band signal. In another aspect, the CSV information 424 is delivered as an out of band signal.

The FEC encoder 414 comprises any combination of hardware and software to perform error coding, such as RS coding on the source-encoded signals 422 and the encapsulated CVS information 426. For example, the FEC encoder 414 operates to produce error coded blocks.

The pre-interleaver 412 comprises a CPU, processor, gate array, hardware logic, memory elements, virtual machine, software, and/or any combination of hardware and software. The pre-interleaver 412 operates to pre-interleave the error coded blocks output from the FEC encoder 414 so the input source maintains its contiguous nature when packed into frames of a superframe. For example, in an aspect, the pre-interleaver 412 operates to form a pre-interleave table that is packed with error coded blocks as described above.

The packer (encapsulator) 416 comprises any combination of hardware and software. In an aspect, the packer 416 operates to encapsulate the error coded blocks from the pre-interleave table to generate a multiplex comprising a sequence of superframes where each superframe comprises four frames. In an aspect, the multiplex is sent to the modulator/transmitter for transmission over a network to one or more receiving devices.

During operation of one or more aspects, the server 400 operates to prepare a multiplex for transmission to receiving devices, wherein the multiplex comprises CSV information and pre-interleaved error coded blocks that are organized to allow for fast service acquisition. For example, when a channel change event occurs, the CSV information is quickly decoded by a receiving device to render a low-resolution version of the new channel. Furthermore, aspects of the system organize the error coded blocks of each frame of the superframe to enable the new channel to be quickly decoded.

In an aspect, the server 400 operates to construct a plurality of transmission frames where each transmission frame represents a selected time interval (i.e., one second). The server 400 also operates to encode one or more channels of data into the plurality of transmission frames, wherein selected data is encoded into predetermined transmission frames so that channel jitter can be absorbed at a receiving device using a single buffer having a selected time duration. Thus, the system operates to provide for fast service acquisition and channel switches between channels of a multimedia multiplex, while allowing receiving devices to absorb channel jitter using a single buffer.

In one or more aspects, the server 400 operates to perform one or more of the following functions in aspects of a service acquisition system.

1. Generate CSV information for each channel to be encoded into a multiplex.
2. Include the CSV information with video information to be error coded.
3. Perform pre-interleaving to rearrange error blocks within a superframe prior to encapsulation, which maintains the contiguous nature of the input source signal.
4. Perform encapsulation to produce a multiplex for transmission.

In an aspect, the service acquisition system is embodied in a computer program comprising program instructions stored on a computer-readable medium, which when executed by at least one processor, for instance, the processing logic 402, provides the functions described herein. For example, the program instructions may be loaded into the server 400 from a computer-readable medium, such as a floppy disk, CDROM, memory card, FLASH memory device, RAM, ROM, or any other type of memory device or computer-readable medium that interfaces to the server 400. In another aspect, the instructions may be downloaded into the server 400 from an external device or network resource that interfaces to the server 400. The program instructions, when executed by the processing logic 402, provide one or more aspects of a service acquisition system as described herein.

Therefore, the server 400 operates in one or more aspects of a service acquisition system to enable fast service acquisition of services included in a multimedia multiplex. It should be noted that the server 400 illustrates just one implementation and that other implementations are possible within the scope of the aspects described herein.

Data Channel MAC Layer Capsule Structure

Figure 5:
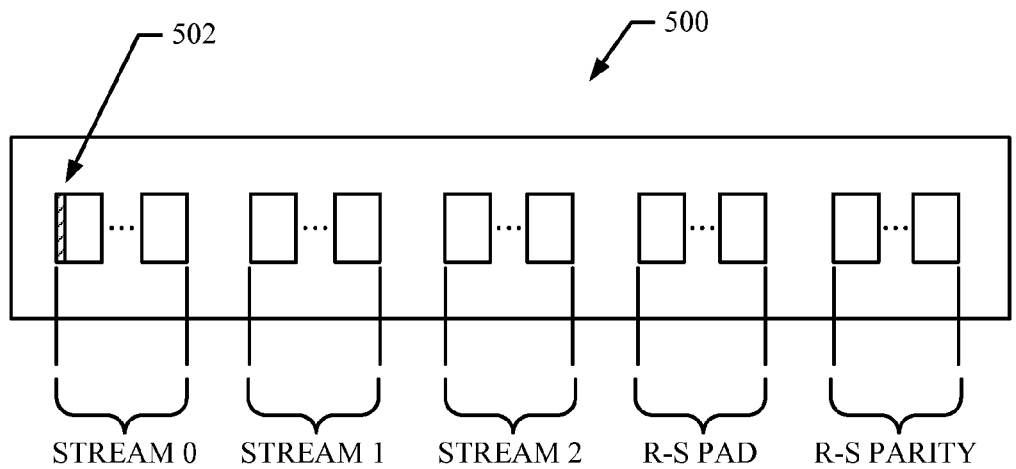
FIG. 5 shows a Data Channel MAC layer capsule structure prior to operation a service acquisition system.

FIG. 5 shows an aspect of a Data Channel MAC layer capsule structure 500 prior to operation of aspects of a service acquisition system. The Data Channel MAC layer capsule 500 comprises the following in the order specified below.

1. Stream 0 packet—This comprises an always-present Stream 0 packet that includes the Data Channel MAC layer capsule header 502.
2. Stream 1 packet—Integral number of MAC layer packets carrying stream 1 data.
3. Stream 2 packet—Integral number of MAC layer packets carrying stream 2 Data.
4. MAC packets containing Stuffing Packets to make the MAC layer capsule an integral multiple of "K", where "K" is the number of information blocks in an RS error control block. For example, for an outer code rate of 12/16, "K" is 12.
5. (NumR-SCodeBlocks)×(N-K) R-S parity packets.

Given the Data Channel MAC layer capsule structure 500 and the relative small size of the stream 0 packet, the MAC layer packets containing the stream 0 packet are certain to occupy only the first of the four frames in a superframe. This information will always be lost in the case of a request for Early Entry/Fast Tuning where the receiver only receives the last three or less frames of a superframe. Since stream 0 carries information (example, working keys) needed to decode the data being carried on stream 1 or stream 2, it is desirable to ensure that a receiving device is able to receive the stream 0 packet if it received any part of the data carried in stream 1 or stream 2.

Re-Ordered Data Channel MAC Layer Capsule Structure

Figure 6:
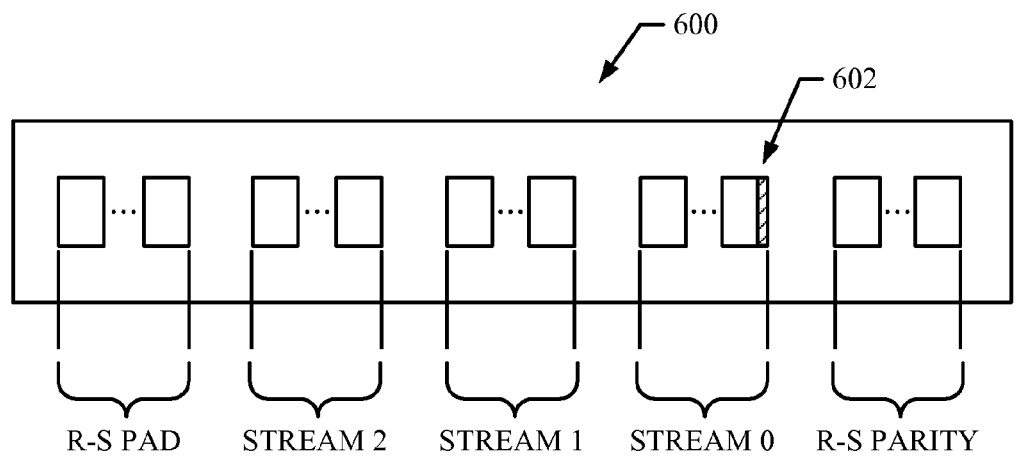
FIG. 6 shows a Data Channel MAC layer capsule structure after operation of a service acquisition system.

FIG. 6 shows an aspect of a Data Channel MAC layer capsule structure 600 generated by aspects of a service acquisition system. In the MAC layer Capsule structure 600, stream 0 is moved towards the end of the Data Channel MAC layer capsule, after Stream 1 or Stream 2 packets are placed in the capsule. This organization ensures that a receiving device is able to receive the stream 0 packet if it received any part of the data carried in stream 1 or stream 2.

In an aspect, the Data Channel MAC layer capsule structure 600 comprises the following in the order specified below.
1. MAC packets containing stuffing packets to make the MAC layer capsule an integral multiple of "K", where "K" is the number of information blocks in an RS error control block. For example, for an outer code rate of 12/16, "K" is 12. Note: RS PAD packets are few (at the most K−1) compared to the MAC packets containing Video data. Therefore, in most of the cases, frame 1 will have some MAC packets containing Video Data. (150 kbps to 500 kbps)
2. Stream 2 packet—Integral number of MAC layer packets carrying stream 2 data.
3. Stream 1 packet—Integral number of MAC layer packets carrying stream 1 data.
4. Stream 0 packet—This comprises an always-present Stream 0 packet that includes the Data Channel MAC layer capsule header 602.
5. (NumR-SCodeBlocks)×(N-K) R-S parity packets.

Availability of OIS Information

In an aspect, for Early Entry/Fast Tuning to occur, the basic information needed on the device is the location of the channel to which a switch is to be made. This location information is present in the OIS. However, the device reads the OIS only in certain cases (e.g. receiving new logical channels or errors on an existing logical channel, etc.) when it is triggered to do so. Thus, channel switching will be slowed if a device waits until the next superframe to receive the OIS after a channel change has been triggered. Note that the OIS provided with one superframe is applicable to the subsequent superframe. Thus, the device would need to wait for an entire superframe to retrieve the OIS information.

Therefore, in an aspect, the trigger for Early Entry/Fast Tuning is provided in advance of the superframe in which the actual switch is performed. This is accomplished by performing the following.
1. Putting the Device in a mode where it receives the OIS every superframe and uses the information when Early Entry/Fast Tuning is triggered. Entry to this mode can be triggered by certain user entered key combinations input to a user interface to trigger a channel switch.
2. Or the Device reads the OIS information every superframe (thus eliminating the need for an embedded OIS)

Figure 7:
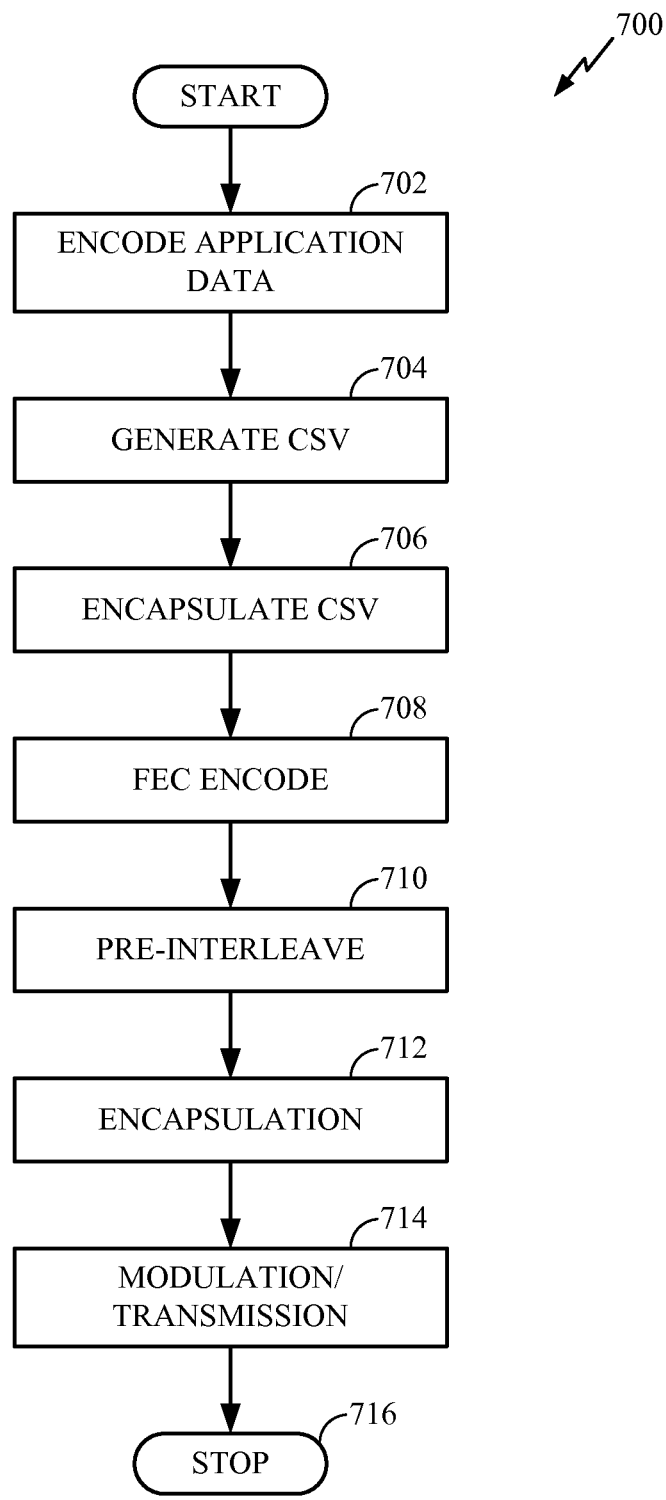
FIG. 7 shows a method for providing aspects of a service acquisition system.

FIG. 7 shows a method 700 for providing aspects of a service acquisition system. For clarity, the method 700 will be described with reference to the server 400 shown in FIG. 4. In an aspect, at least one processor, such as the processing logic 402, executes machine-readable instructions to control the server 400 to perform the functions described below.

At block 702, application data is encoded. For example, the application data may comprise video streams as shown at 420. In an aspect, the source encoders 408 operate to encode the application data to produce encoded signals 422.

At block 704, CSV information is generated. For example, the source encoders 408 operate to generate the CSV information 424, which in an aspect comprises a low-resolution independently decodable version of the input video 420.

At block 706, the CSV information is encapsulated. For example, the packer 410 operates to encapsulate the generated CSV information 424 to produce encapsulated CSV information 426.

At block 708, the encoded source produced at block 702 and the encapsulated CSV produced at block 706 are FEC encoded. For example, in an aspect the FEC encoder 414 operates to encode this information into error coded blocks.

At block 710, the error coded blocks produced at block 708 are pre-interleaved. For example, the pre-interleaver 412 operates to pre-interleave the error coded blocks. For example, the pre-interleaver 412 operates as described above to generate a pre-interleave buffer to pre-interleave the error coded blocks to form interleaved error coded blocks.

At block 712, the interleaved error coded blocks are encapsulated to form a multiplex that comprises a sequence of superframes where each superframe comprises four frames.

At block 714, the multiplex is modulated and transmitted over a network to receiving devices. For example, the modulator/transmitter 404 operates to receive the multiplex and modulate and transmit the multiplex over data network using the channel 418.

Thus, the method 700 operates to produce a multimedia multiplex that is transmitted to receiving devices and which allows a device to perform fast service acquisition. It should be noted that the method 700 represents just one implementation and that other implementations are possible within the scope of the described aspects.

Figure 8:
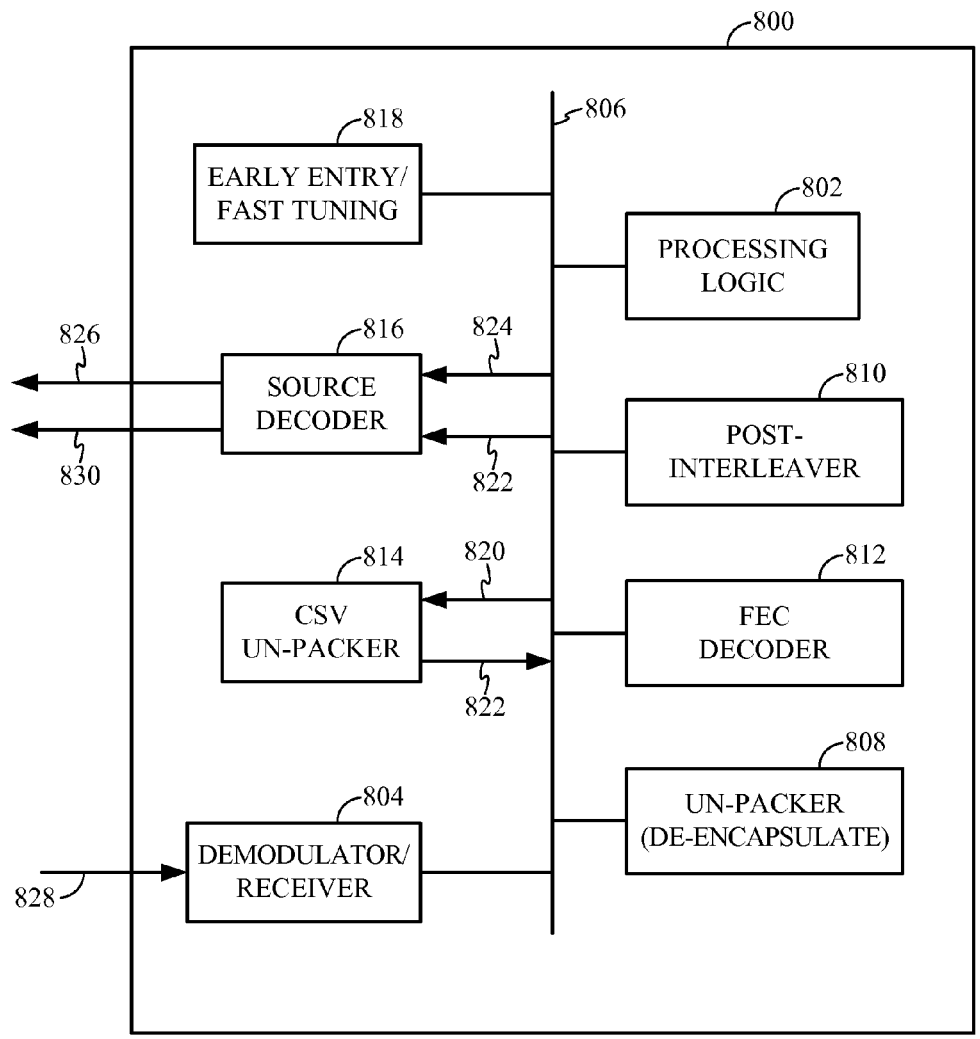
FIG. 8 shows a device for use in aspects of a service acquisition system.

FIG. 8 shows a device 800 for use in aspects of a service acquisition system. For example, the device 800 is suitable for use as the device 304 shown in FIG. 3. The device 800 comprises processing logic 802 and demodulator/receiver logic 804, which are coupled to a data bus 806. The device 800 also comprises source decoder 816, CVS un-packer 814, early entry/fast tuning logic 818, post-interleaver logic 810, FEC decoder 812, and un-packer 808, which are also coupled to the data bus 806.

In one or more aspects, the processing logic 802 comprises a CPU, processor, gate array, hardware logic, memory elements, virtual machine, software, and/or any combination of hardware and software. Thus, the processing logic 802 generally comprises logic to execute machine-readable instructions and to control one or more other functional elements of the device 800 via the internal data bus 806.

The demodulator/receiver logic 804 comprises hardware logic and/or software that operate to allow the device 800 to receive a multimedia multiplex over a data network from a broadcast server. In an aspect, the demodulator/receiver logic 804 comprises a communication channel 828. For example, in an aspect, the communication channel 828 comprises any suitable type of communication link (i.e., an OFDM link) to allow the device 800 to communicate with one or more data networks to receive a multimedia multiplex.

In an aspect, the demodulator/receiver logic 804 has a buffer 832 comprising any suitable memory or storage device. In an aspect, the demodulator/receiver logic 804 operates to receive a plurality of transmission frames wherein each transmission frame represents a selected time interval and comprises one or more channels of data. Selected data is encoded into predetermined transmission frames. The buffer 832 has a selected time duration (i.e., the duration of one transmission frame) and operates to buffer the received transmission frames so that channel jitter is absorbed.

The un-packer (de-encapsulator) 818 comprises any combination of hardware and software. In an aspect, the un-packer 818 operates to unpack interleaved error coded blocks from a received multiplex. For example, in an aspect, the un-packer 818 operates to undo the operation of the packer 416 shown in FIG. 4. As a result of the operation of the un-packer 818, interleaved error coded blocks are produced.

The post-interleaver 810 comprises a CPU, processor, gate array, hardware logic, memory elements, virtual machine, software, and/or any combination of hardware and software. The post-interleaver 810 operates to de-interleave the interleaved error coded blocks produced by the un-packer 818. For example, the post-interleaver 810 operates to undo the operation of the pre-interleaver 412 shown in FIG. 4. For example, in an aspect, the post-interleaver 810 operates to form error coded blocks as described above.

The FEC decoder 812 comprises any combination of hardware and software to perform error decoding on received error coded blocks produced by the post-interleaver 810. For example, the FEC decoder 812 operates to produce encoded source 824 and encapsulated CSV 820 information that is included in a received multiplex.

The CSV un-packer 814 comprises any combination of hardware and software that operates to unpack or de-encapsulate the CSV information 820 received in a multiplex. The CSV un-packer 814 operates to produce CSV information that represents a low resolution and independently decodable version of video for a selected channel in the received multiplex. For example, the CSV un-packer 814 operates to undo the operation of the CSV packer 410 shown in FIG. 4.

The source decoder 816 comprises any type of source decoder that operates to receive coded source information 824 and produce corresponding decoded source streams 826. The source decoder 816 also operates to receive CSV information and produce a CSV signal 830 that is a low-resolution independently decodable signal, which corresponds with a selected channel of a received multiplex. Thus, the source decoder 816 operates to render decoded source streams.

The early entry/fast tuning logic 818 comprises a CPU, processor, gate array, hardware logic, memory elements, virtual machine, software, and/or any combination of hardware and software. The early entry/fast tuning logic 818 comprises detection logic that is configured to detect a channel switch request and control the device 800 to quickly switch to the requested channel. In an aspect, the channel switch request is generated by the processing logic 802 in response to a user input. In another aspect, the channel switch request is generated by the processing logic 802 base on any other criteria. For example, the processing logic 802 may generate a channel switch request based on receiving control information from a distribution network.

During operation of one or more aspects, when a channel switch request is triggered, the early entry/fast tuning logic 818 operates to control the decoding of a received multiplex so that the selected services may be decoded. In an aspect, the CSV for the selected channel is quickly decoded and rendered so that the device user receives a very fast, albeit low-resolution, displayed response to the channel change request.

Because of the arrangement of the error coded blocks provided in aspects of the service acquisition system, the information needed to decode the selected new channel is readily available. For example, in an aspect, OIS are arranged to occur at the end of a superframe so that these symbols can be retrieved even if an early entry/fast tuning trigger occurs during the middle of a superframe.

In one or more aspects, the device 800 operates to perform one or more of the following functions to provide fast acquisition and channel switching in aspects of a service acquisition system.

1. Receive an Early Entry/Fast Tuning trigger to tune to a new channel.
2. Perform post-interleaving to undo rearrangement of error coded blocks by a transmitter.
3. Un-package CSV information from the error coded blocks.
4. Decode CSV information to produce a CSV signal that can be rendered on the device.
5. Determine data for the requested new channel.
6. Decode the data to produce a video signal for the requested channel.
7. Render the video signal associated with the requested channel.

In an aspect, the service acquisition system is embodied in a computer program comprising program instructions stored on a computer-readable medium, which when executed by at least one processor, for instance, the processing logic 802, provides the functions described herein. For example, the program instructions may be loaded into the device 800 from a computer-readable medium, such as a floppy disk, CDROM, memory card, FLASH memory device, RAM, ROM, or any other type of memory device or computer-readable medium that interfaces to the device 800. In another aspect, the instructions may be downloaded into the device 800 from an external device or network resource that interfaces to the device 800. The program instructions, when executed by the processing logic 802, provide one or more aspects of a service acquisition system as described herein.

Therefore, the device 800 operates in one or more aspects of a service acquisition system to enable fast acquisition and channel switching between services provided in a multimedia multiplex. It should be noted that the device 800 illustrates just one implementation and that other implementations are possible within the scope of the described aspects.

Figure 9:
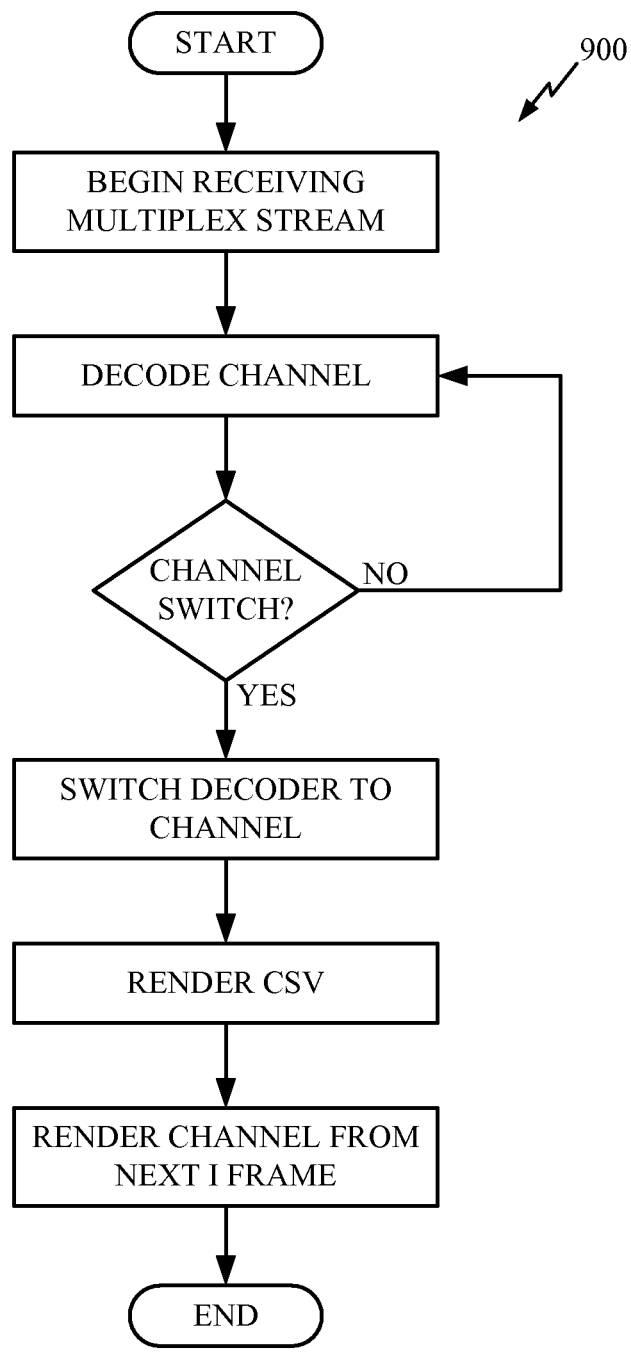
FIG. 9 shows a method for use in aspects of a service acquisition system.

FIG. 9 shows a method 900 for use in aspects of a service acquisition system. For clarity, the method 900 will be described with reference to the device 800 shown in FIG. 8. In an aspect, at least one processor, such as the processing logic 802, executes machine-readable instructions to control the device 800 to perform the functions described below.

At block 902, a multimedia multiplex is received and buffered. For example, the multiplex is received by the demodulator/receiver 804. The received multiplex is generated in accordance with aspects of the service acquisition system so that the multiplex comprises a super frame generated as described above to provide fast service acquisition and channel switching. For example, CVS information and pre-interleaving as described above are used to produce the super frame. In an aspect, the received multiplex is buffered by the buffer 832 to absorb channel jitter.

At block 904, a channel in the received multiplex is decoded. For example, the processing logic 802 operates to control the functional elements of the device 800 to decode a channel in the received multiplex.

At block 906, a test is performed to determine if an Early Entry/Fast Tuning trigger has been received. For example, the trigger may be provided by a device user or may be automatically generated. In an aspect, the processing logic 802 operates to determine if the Early Entry/Fast Tuning trigger has been received. If the trigger has not been received, then the method returns to block 904 where the same channel is decoded. If a trigger is received, the method proceeds to block 908.

At block 908, a decoder is switched to decode the newly requested channel. For example, the processing logic 802 operates to control the device 800 to begin decoding the newly requested channel.

At block 910, a CSV associated with the newly requested channel is rendered. For example, the CSV is a low-resolution of the newly requested channel that is encoded into the received multiplex. In an aspect, the CSV un-packer 814 operates to unpack the CSV so that it can be rendered while the decode attempts to switch to the newly requested channel.

At block 912, the newly requested channel is decoded and rendered. For example, the processing logic 802 operates to control the device 800 to render the requested channel. Therefore, after the Early Entry/Fast Tuning trigger, the device user sees a low resolution version of the requested channel followed by the full resolution version when the decode process of the device is able to decode the channel. In an aspect, the device operates to render the new channel from the next available I-Frame.

Thus, the method 900 operates to allow a device to perform fast service acquisition and channel switching according to aspects of a service acquisition system. It should be noted that the method 900 represents just one implementation and that other implementations are possible within the scope of the described aspects.

Creation of the CSV

In one or more aspects, the source encoders 408 operate to generate the CSV according to the following. A human vision model is often included in a video codec to mimic how a human perceives disparities between a source and its compressed version. Girod's model reflects the visual response to disparities directly on to the input video signal. This enables quantification of the minimum acceptable disparities in terms of the visual response to design optimal encoders and decoders. Spatial and temporal masking effects occur due to saturation in the fovea. Spatial masking refers to the effect of a video signal on the visibility of noise at a given pixel location. Temporal masking is similar to spatial masking except that the noise visibility at a pixel location is due to the video signal at the same spatial location but in a temporally adjacent frame.

In other words, temporal masking relates to the time response of the eye toward appearing and disappearing objects. Scene changes, introduction of new objects in the video and switching to new channel are examples of appearing objects and the response time for the human eye is around 44 milliseconds (ms). While the response time for disappearing objects as in cross fades is around 100 ms. The human eye integrates the incident signal along the time axis before it is interpreted by the brain. (30 frames per second provides sufficiently smooth motion rendition for most applications). Hence our eyes are more tolerant to (motion) interpolated images than to sudden instantaneous disruptions (such as camera flashes).

These observations are adopted in creation of the CSV. Predictive coding is heavily used in video compression due to high spatial and temporal correlation within and across frames. In generating the CSV, very high compression can be applied due to the poorer sensitivity of human eye to new content.

Independent Side-Channel

Sub-sampling in spatial (e.g. from QVGA—320×240 pixels to $Q^2$VGA—160×120 pixels) and temporal domain (from 30 fps to 5fps) are simple compression mechanisms that can be inverted (up-sampled to original resolution and frame rate up conversion using methods at the decoder as a post-processing operation). Such post-processing mechanisms are part of standard image processing libraries in most terminals including handhelds. Re-sampling in spatial domain involves low-pass filtering (to avoid aliasing) followed by decimation. Frame rate up conversion also involves spatial pixel interpolation as part of the motion compensation process after motion vector interpolation.

Since the CSV is required to be independently decodable, this places an I-frame at the beginning of the CSV since the primary data is not available to be used as reference. The typical average bit rate for transmitting QVGA video at 30fps is approximately 256 kbps using the H.264 codec. While the average bit rate to transmit the same video at $Q^2$ VGA resolution and 5fps frame rate is approximately 10kbps. Hence the overhead for CSV is about 5 %.

Core Information

Hybrid video coding entails spatial and temporal prediction followed by transformation, quantization and entropy coding. The essence of the compressed data lies in the intra-coded data used for reference, the mode of prediction and motion information. The primary bitstream carries all of this information to generate a full fidelity video. The CSV can be created as a scaled, compact form of this core information using one or more of the following methods:

1. Intra data: Combining a 2×2 window of macroblocks in the primary into one MB in the CSV—by simple merging of mode information. If 3 out of 4 or all 4 modes are the same, the mode of the corresponding macroblock in the CSV is set to this mode. Outlier macroblock(s) is (are) so marked. In H.264, intra MBs have 2 modes—Intra_16×16 or Intra_4×4. The latter indicates presence of directional information (and not a uniformly flat region) which is critical for mode based spatial error concealment.
2. Inter data: Motion vector processing. In an aspect, merging and scaling can be applied to combining MBs in the primary to form a MB in the CSV. For example, oversampling all inter modes to 4×4 and combining them appropriately paying attention to outliers is one technique that may be utilized.

Data partitioning of the coded video bitstream based on priority is a popular method of improving error resilience and enabling scalability in video coding. For example, in H.264, slice data partitioning is a feature that enables each slice to be coded as 3 separate data units called Network Abstraction Layer Units (NALU). Partition A carries critical information such as macroblock headers and motion vector information. Partition B contains intra coefficient data which is next in priority and partition C contains coefficient data for inter coded or temporally predicted blocks. In an aspect, the CSV could be generated by merging and scaling Partition A data to enable use of CSV for error recovery and concealment and to avoid computationally intensive encode operations like Motion estimation.

Transmission of CSV

In single layer encoding schemes, CSV can be carried in the user data syntax of standard compliant bitstreams. For example, the CSV can be encoded as one of the Supplemental Enhancement Information syntax elements in H.264 or even as a redundant picture or slice. Alternatively, the CSV can be carried as an auxiliary packet in a side channel (e.g. supplemental channels in 1× networks) or in a low priority channel if layered coding and modulation is supported.

Applications

In an aspect, transport layer functionality is provided by Stream and MAC layers. Each service (a conglomeration of associated audio, video and/or data) is transmitted in one or more channels. A client at the device "tunes" to the channel(s) of interest and reads just the data pertaining to the service (or in general TV terms—channel) of interest out of the multiplex.

When a channel change is initiated by the user (e.g. a key press), the application notifies the physical layer which tunes to the corresponding channel(s). This can occur at Superframe (1 sec) boundaries or at frame boundaries (0.25 sec). In an aspect, the video codec carries a random access point (I or distributed I frames) at the beginning of every superframe. In order to enable faster channel switching (at frame boundaries), the CSV is carried in the 3rd (or possibly 4th) frame. Compressed data is written into the Physical layer packets in such a way as to enable this feature. Thus, a channel change initiated in the $1^{st}$ half of a second (synchronized to frame time) can occur (indicated by video playback of the new channel) at the ¾th sec mark of the superframe (ignoring decoder buffers). Given that B-frames are supported, a potential delay of 2 frames is possible (66 ms). This is in addition to buffer latencies in display/render queue. Hence, a channel switch latency of 0.25+0.066+0.264=0.58 sec is achievable.

Application of CSV to Error Recovery and Concealment

Since the CSV is a condensed version of the primary data that co-exists in time at the decoder (whether it is received in a side-channel, in the enhancement layer or in the primary bitstream as user-data), it can provide valuable insights into primary data that are affected by errors due to error-prone environments such as wireless channels.

CSV can be used to recover (identify the extent of loss) lost or corrupt parts of the primary through correlation of re-sync markers in the primary with the corresponding slice or MB. Frame numbers, picture-order-count in H.264, sequence numbers and/or presentation time stamps can be used to identify the corresponding frames in the CSV. When intra macroblocks in the primary are lost (either in intra or predicted frames), decoding just the appropriate parts of the CSV (slice and MB header) can provide mode and direction information for concealing new (scene change that is coded as I-frame) or appearing objects (occlusions coded as intra MBs or slices in P or B-frames).

When inter macroblock data is lost in the primary, be it just the motion vectors or inter coefficients, information in the corresponding frame of CSV can be extended for recovery and concealment. If method 1 for hybrid coding was used, the corresponding information in the CSV may or may not be coded in the same mode. For example, a MB coded as intra in primary may be coded as inter in the CSV (due to lower quality requirements). This is particularly helpful, since temporal concealment algorithms are unable to derive the correct motion vector when some MBs in the window of interest are intra coded.

In a closed system, the encoder and decoder are designed and implemented with complete autonomy. Hence, the encoder is fully aware of the capabilities of the decoder implementation and the decoder is aware of the optimizations and construction of the encoder bit streams. This enables a better, more robust and cost (Rate-Distortion cost) efficient method to generate CSV and other applications of the disclosure including error recovery, error concealment and frame rate up conversion.

In one or more aspects, the system operates to transmit a CSV of the media. When indicated by the higher level application of the need, as in when the user initiates channel switching through key presses, the decoder starts decoding and displaying the CSV of the new channel almost instantaneously (e.g. after the lower layers—transport and physical layers—have switched to the new channel). This may reduce the switch time to a few milliseconds in the range of 10-100 milliseconds. In non-channel switch scenarios, CSV information, for example, I-frames/MBs and MV information may be used for error recovery (with/without some processing) where in neighboring frames' information is used to conceal lost MBs or MVs.

Implementation Illustration

The following is an implementation illustrating use of an integrated codec and physical layer for efficient multimedia streaming in accordance with aspects of the service acquisition system described herein. For example, this implementation describes aspects of a highly integrated architecture provided by multimedia codecs in the application layer to provide channelization in the physical layer for efficient multimedia communications, particularly for multimedia streaming or multimedia broadcast/multicast. It should be noted that various aspects apply to any individual or combination of existing or future application, transport and physical layer or other technologies. As a result, the various aspects provide effective communications, interactions and understanding between OSI layers with tight coupling that eliminates/reduces jitter and processing buffers at various points thus reducing latencies. Thus, one of the primary advantages is fast channel switching in multimedia mobile broadcasts.

Figure 10:
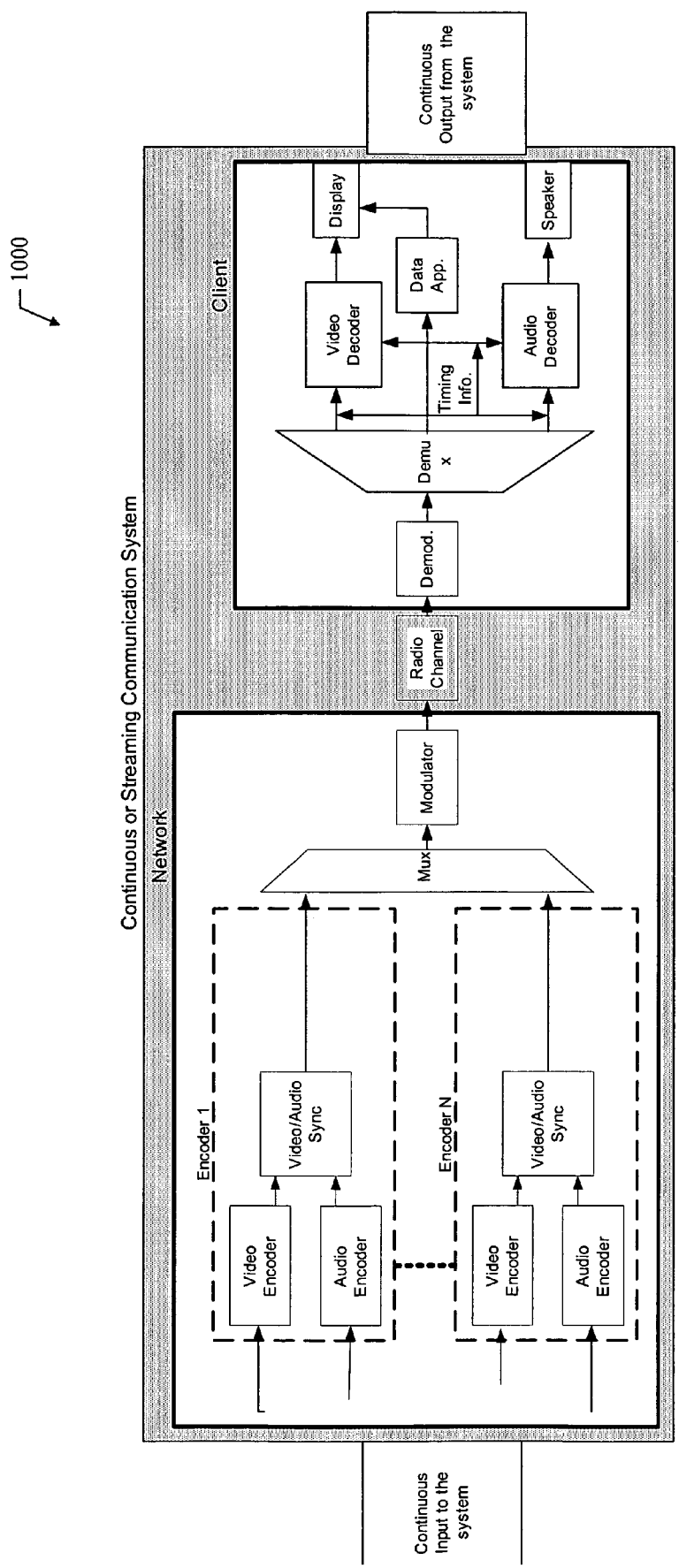
FIG. 10 shows an aspect of a communication system.

FIG. 10 shows an aspect of a communication system 1000. The system 1000 is a multimedia streaming system where the input to the system is a continuous (discrete time events but never ending) stream of data and the output from the system is a continuous stream of data. For example, the client shown in FIG. 10 may be part of a mobile device.

Figure 11:
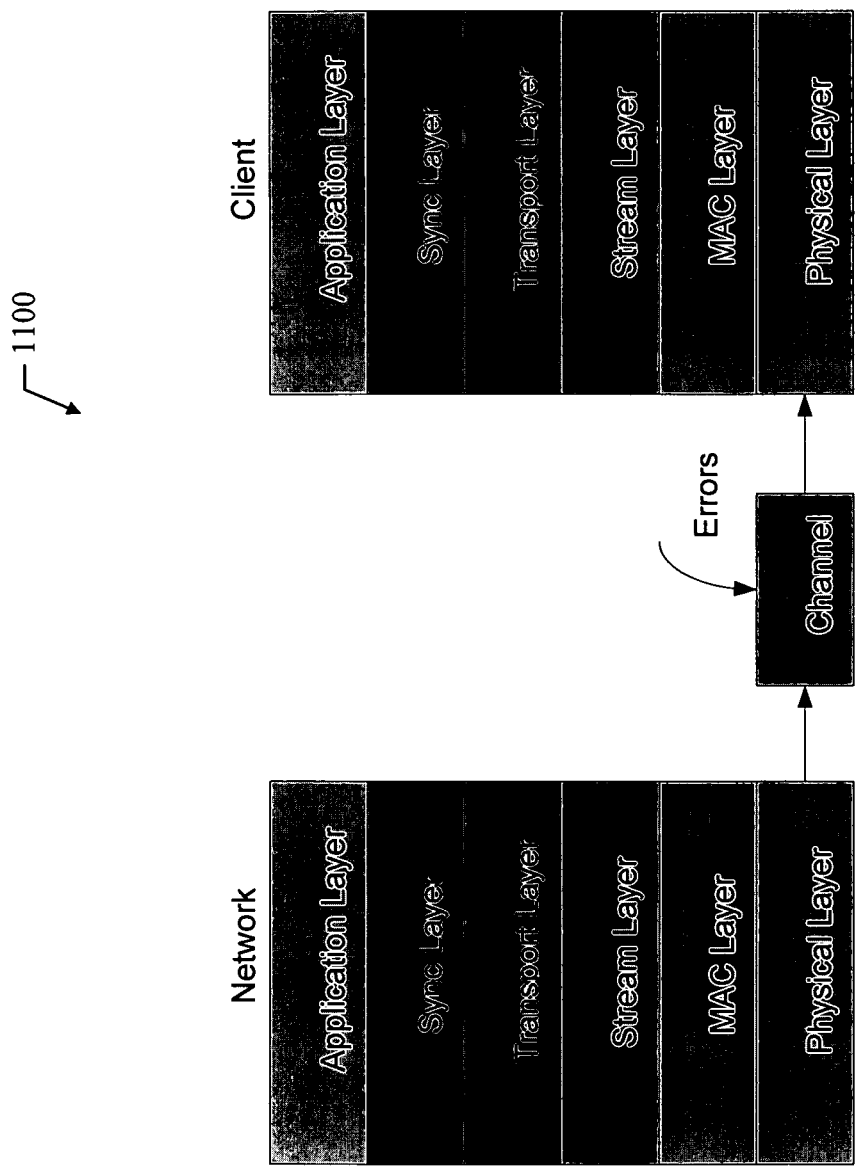
FIG. 11 shows a diagram of OSI layers or a protocol stack for use in aspects of a service acquisition system.

FIG. 11 shows a diagram of OSI layers or a protocol stack 1100 for use in aspects of a service acquisition system. For example, the protocol stack 1100 is suitable for use in the service acquisition system shown in FIG. 3. It should be noted that the protocol stack 1100 is just one implementation and that various aspects of the described system can be extended to any layered architecture. The following describes the data flow through the layers of the protocol stack 1100; however, it should be noted that the description is based on a common understanding of data structures within and between the layers.

The service acquisition system operates to maintain continuous or streaming communication of data from input to output through the network to the client. In an aspect, the system behaves as a single FIFO buffer.

Let's assume a basic unit of time (T) is equal to, e.g., one second. Let the data pertaining to this unit of time be called a Super Frame (SF). Then a SF is a packet whose payload contains data, for e.g. multimedia data that can be consumed in T seconds (T=1 in this example).

Figure 12:
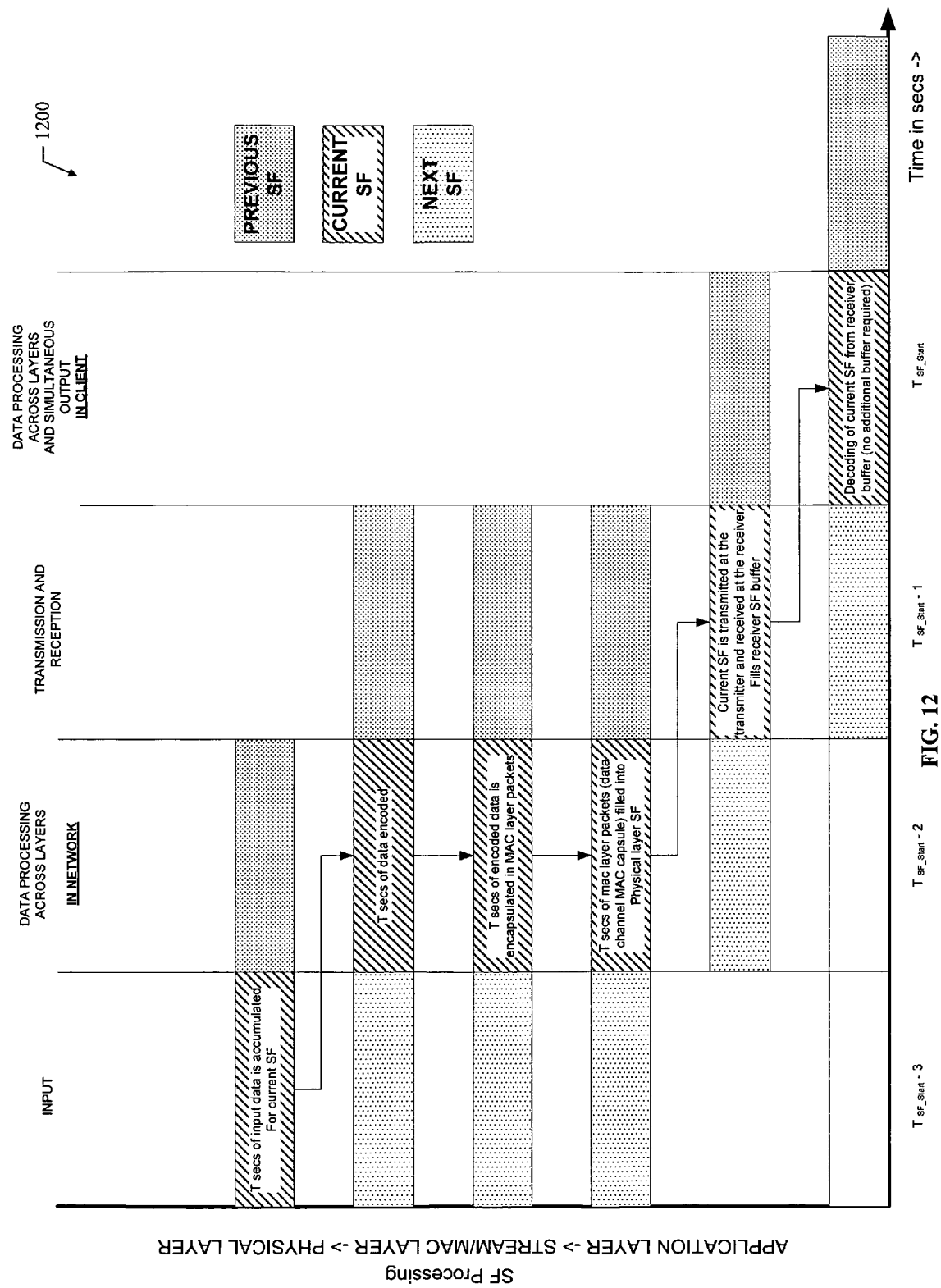
FIG. 12 shows a diagram that illustrates Super Frame data processing from application through physical layer at both network and client sides of a communication system.

FIG. 12 shows a diagram 1200 that illustrates Super Frame data processing from application through physical layer at both network and client sides of a communication system. In the, diagram 1200, the x-axis represents time in seconds. The y-axis depicts data processing from the input through the encoder, stream/MAC layer encapsulation processing to packaging into a physical layer SF. The diagram 1200 shows the fundamental operations of SF processing across the system where the current SF is indicated by hashed blocks. The input for this SF enters the system at time (T=SF_Start−3), and it is encoded, outer coded, and encapsulated into SF at time (T=SF_Start−2). This SF is then transmitted and received (the transmitter to receiver delay is on the order of nanoseconds since the physical layer is RF) at time (T=SF_Start−1). Hence, the current SF's data fills the receiver buffer (i.e., buffer 832) at time (T=SF_Start−1) and is available for decoding and immediate presentation at time (T=SF_Start). The time stamps engrained in the audio or video data units for the current SF are offsets from time (T=SF_Start).

In a synchronous system, T=SF_Start (T in general) is tied to a system clock, for e.g. GPS when available both at the network and client, and provides the SF timing. This eliminates the need for a separate media clock (VCXO or oscillator) in the client, thus reducing cost particularly if the client is hosted on a handheld device.

In an asynchronous system, the SF processing still remains the same. The time stamps on the audio/video data units are derived from an internal clock, such as a PCR (Program Clock Reference in MPEG-2 Systems).

In either case, the receiver buffer (i.e., buffer 832) is now tightly coupled: to any decoder buffer (they can potentially share the same buffer) such that there is minimal de-jitter required at the decoder (less than 100 ms). This enables fast channel switching as described below.

FIG. 13 shows a diagram 1300 that illustrates fast channel switching provided by aspects of a service acquisition system. For example, the system can provide fast channel switching in under two seconds maximum and one second on average when T=1 second. The diagram 1300 represents four channels and three superframes: SF+2, SF+1 and SF. When a device user initiates a channel change from channel A to B in the time frame corresponding to SF, reception and(/or) decoding switches to receiving channel B at time SF+1 and the data in SF+1 is available for decoding at the beginning of SF+2.

Since video and audio compression involves temporal prediction, independent decoding is restricted to random access points such as I-frames. However, since the encoder is aware of the SF boundaries, it can suitable place random access points (I-frames, progressive refreshes, or other means) at the beginning of the SF corresponding to when physical layer acquisition is possible. This eliminates the need for random access points arbitrarily, thus improving compression efficiency. It also ensures fast channel switching since a random access point is available at the beginning of every SF for immediate decoding and display of the new channel. It should also be noted that the time duration of the SF could be set to 1 second, 5 seconds, or any unit of time as desired or as system design permits.

Application Layer Processing

Consider video data traversing through the system on a SF basis. The video encoder extracts video data or information that can be consumed in T seconds. (Consumption can be considered to be, for example, video data that is displayed for T seconds). Let this be called a T-packet or the Super Frame (SF).

Sync Layer Processing: Synchronization Information

Timing information for e.g. time stamps, for video data units (e.g. compressed access units or video frames) that comprise the current T-packet or SF is assigned to the data units. These time stamps are sampled from the incoming clock (e.g. PCR) which is carried along with the audio and video data as in an asynchronous system for e.g. DVB, ATSC using MPEG-2 Systems protocols.

In a synchronous system where the media clock is synchronous to system clock, the time stamps are a fixed offset from the incoming media clock (PCR/PTS), which is equal to the fixed difference between the incoming media clock (PCR) and the system clock. Therefore, aspects of a synchronous system provide the following.

a. Eliminate the need for sending a clock thus eliminating any timing de-jitter buffer.
b. Client can synchronize off a local clock that is synchronized to common time such as GPS.

Transport Layer Processing

Transport layer provides framing for sync encapsulated audio/video into fixed length packets, which correspond to the physical layer packet sizes. These are fixed length packets.

FIG. 14 shows a diagram 1400 that illustrates the flow of T-packets in aspects of a service acquisition system. For example, the diagram 1400 shows how T-packets are encoded and encapsulated in a current (or 1st) superframe, transmitted at the transmitter in the network, and received at the receiver in the client in a second superframe. As a result, the T-packets become available and processed/consumed in a third superframe. Each T-packet is independently receivable and decodable. Therefore there is minimal de-jitter at $T_{SF\_start}$. It should be noted that the application layer is aware of the Stream/MAC layer and physical layer packetization/encapsulation/channelization logic and structure (i.e., see FIG. 11).

FIG. 15 shows a diagram 1500 that illustrates a video frame arrangement in an aspect of a T-packet. For the frame arrangement shown, base and enhancement layers are provided and the source order is equal to the presentation order. Thus, a T-packet is received in source order and encoded. The order of frames after compression is retained, and the T-packet is output from the encoder in decode order.

After the T-packet traverses through the transport and physical layers in network and client, it reaches the video decoder in the client in the decode order. Hence, the decoder is able to decode one T-packet after another in continuous succession thereby eliminating/reducing the need for additional decoder buffers.

Figure 16:
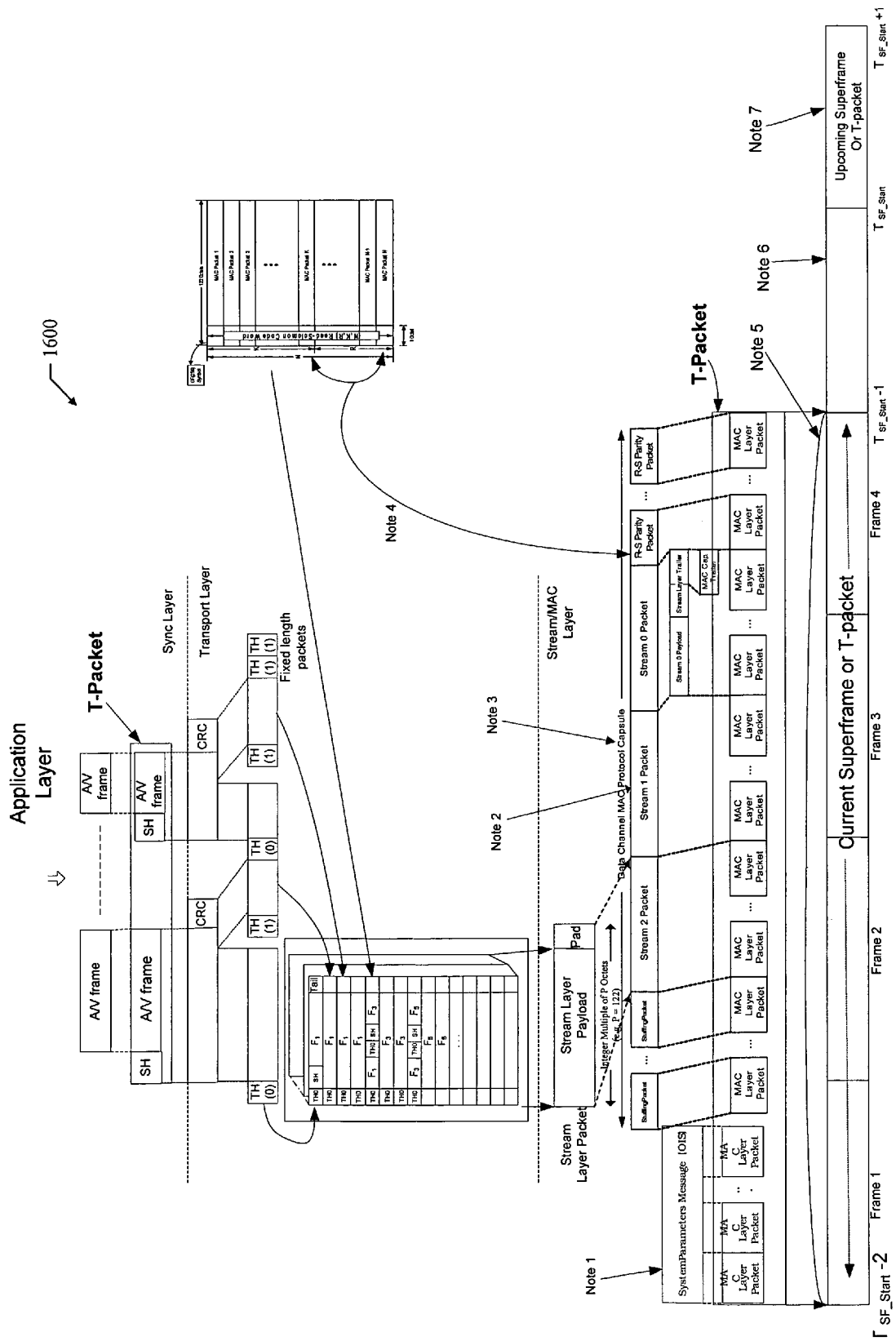
FIG. 16 shows a diagram that illustrates a video frame arrangement in an aspect of a T-packet.

FIG. 16 shows a diagram that illustrates a video frame arrangement 1600 in an aspect of a T-packet. For example, the video frame arrangement 1600 is suitable for arranging video frames in aspects of a service acquisition system.

The following "Notes" provide information about various aspects of the video frame arrangement 1600.

Note 1 OIS contains among other information, an index to the location of the T-packet for the program/channel of interest. The client "wakes up" only for this duration, thus saving power. For fast channel acquisition, this message and the OIS can be carried at the end of the T-packet.

Note 2 Audio and Video corresponding to the same T-packet may be encapsulated in different stream layer packets.

Note 3 Alternatively audio and video corresponding to the same T-packet may be encapsulated in the same or different MAC protocol capsule.

Note 4 Reed Solomon (RS) is an example of Outer code or forward error correction (FEC). The parity blocks of RS are carried at the end of a T-packet. When the receiver receives the first 3 frames of the T-packet without errors, the last frame of the T-packet does not have to be received. The low power handset host for the client does not have to "wake up" to receive this, thus saving power.

Note 5 A T-packet is encoded, encapsulated, and "filled" into physical layer packets. Encoder, MAC and Physical layers are aware of T-packet boundaries.

Note 6 A T-packet encoded/encapsulated in a previous second is transmitted and received during this period.

Note 7 A T-packet received in a previous second is consumed in this period.

Therefore, the video frame arrangement 1600 is suitable for use in aspects of a service acquisition system. It should be noted that the arrangement 1600 is just one implementation and that other implementations are possible with the scope of the described aspects.

Figure 17:
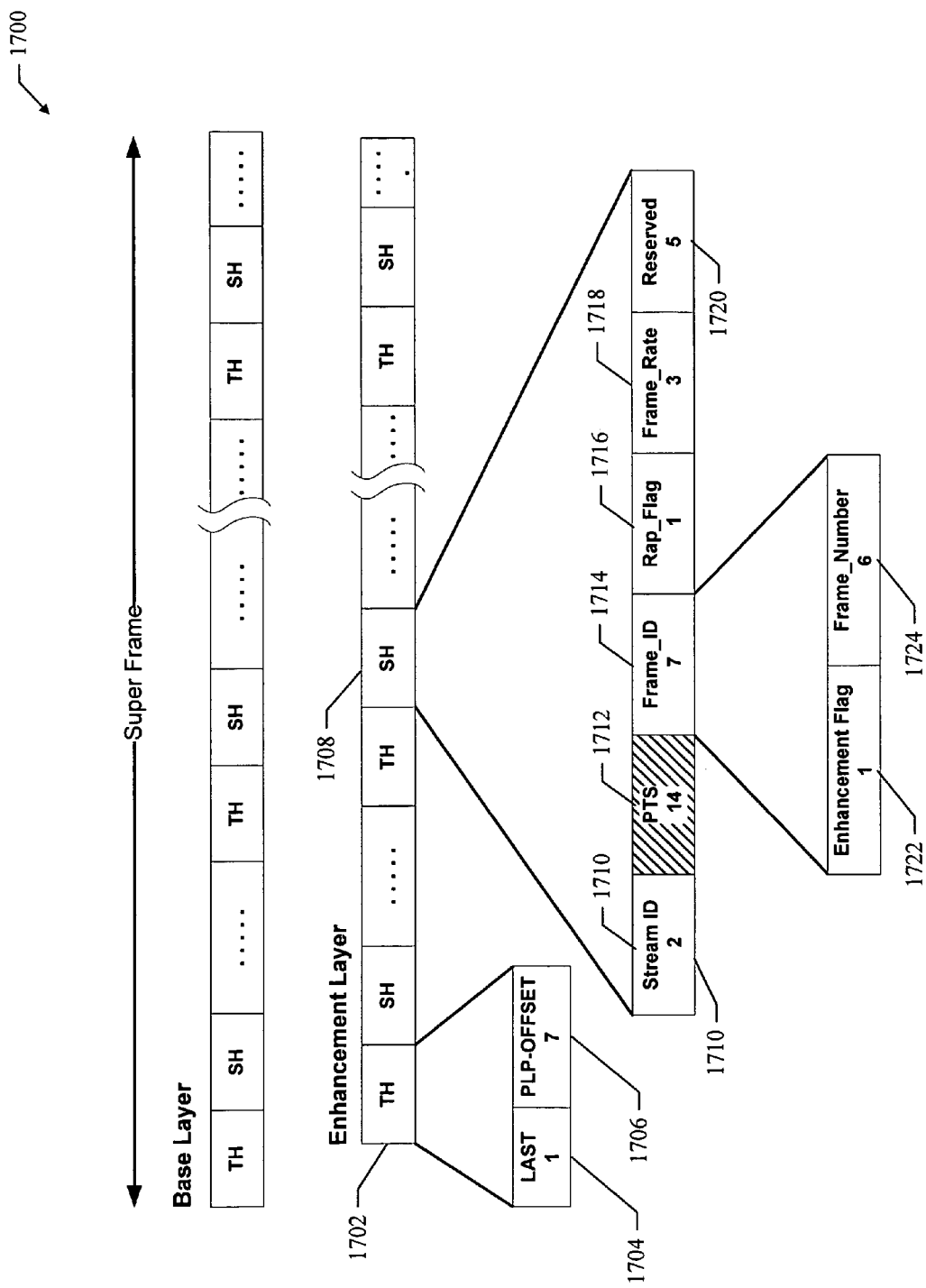
FIG. 17 shows a diagram that illustrates an arrangement of transport headers (TH) and sync headers (SH) used in base and enhancement layers of a Super Frame.

FIG. 17 shows a diagram that illustrates an arrangement 1700 of transport headers (TH) and sync headers (SH) used in base and enhancement layers of a Super Frame. In an aspect, the TH 1702 comprises a last indicator 1704 and a physical layer packet (PLP) offset 1706.

In an aspect, the SH 1708 comprises a stream identifier 1710, presentation time stamp (PTS) 1712, frame identifier 1714, random access point (RAP) flag 1716, frame rate identifier 1718, and reserved bits 1720. The frame identifier 1714 comprises and enhancement flag 1722 and a frame number 1724.

In an aspect, the PTS 1712 is equal to the incoming time stamp (ts) for asynchronous systems, and for synchronous systems, the PTS 1712 is equal to ts+(PCR−system clock).

Therefore, the video frame arrangement 1700 is suitable for use in aspects of a service acquisition system. It should be noted that the arrangement 1700 is just one implementation and that other implementations are possible with the scope of the described aspects.

Figure 18:
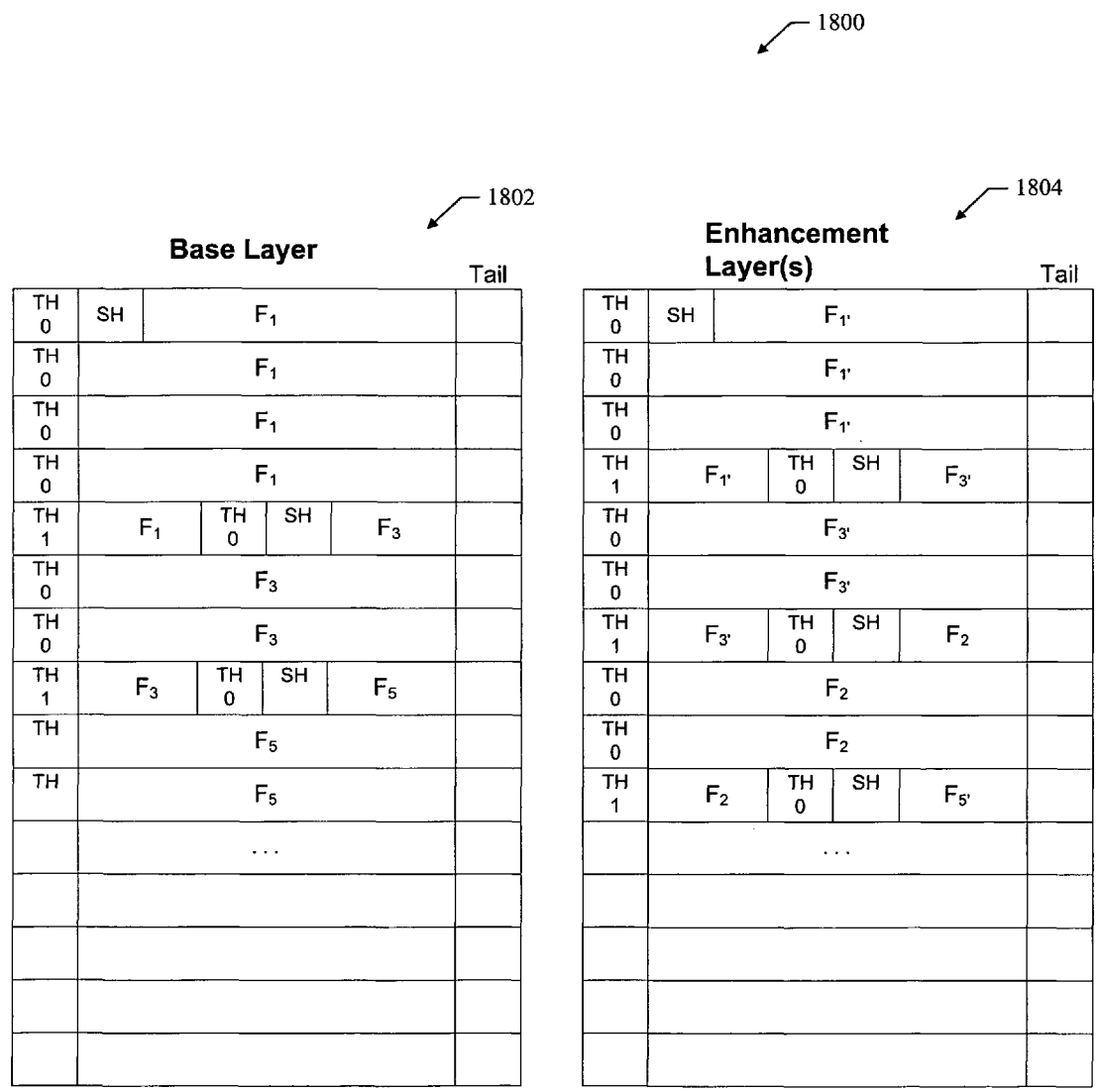
FIG. 18 shows a forward error correction (FEC) code block structure for use in aspects of a service acquisition system.

FIG. 18 shows a forward error correction (FEC) code block structure 1800 for use in aspects of a service acquisition system. For example, the code block structure 1800 comprises a base layer 1802 code block structure and an enhancement layer 1804 code block structure. The code block structure 1800 comprises Transport Headers, Sync Headers, and tail bits with CRC. The code block structure 1800 illustrates how audio and video frame data is organized for base and enhancement layers for use in aspects of a service acquisition system. In an aspect, Video data can be optionally encoded as a single (layer) bitstream or in multiple layers for scalability. In addition, random access points aligned with T-packet boundaries can be carried in either or all layers. It should be noted that the code block structure 1800 represents just one implementation and that other implementations are possible within the scope of the described aspects.

Figure 19:
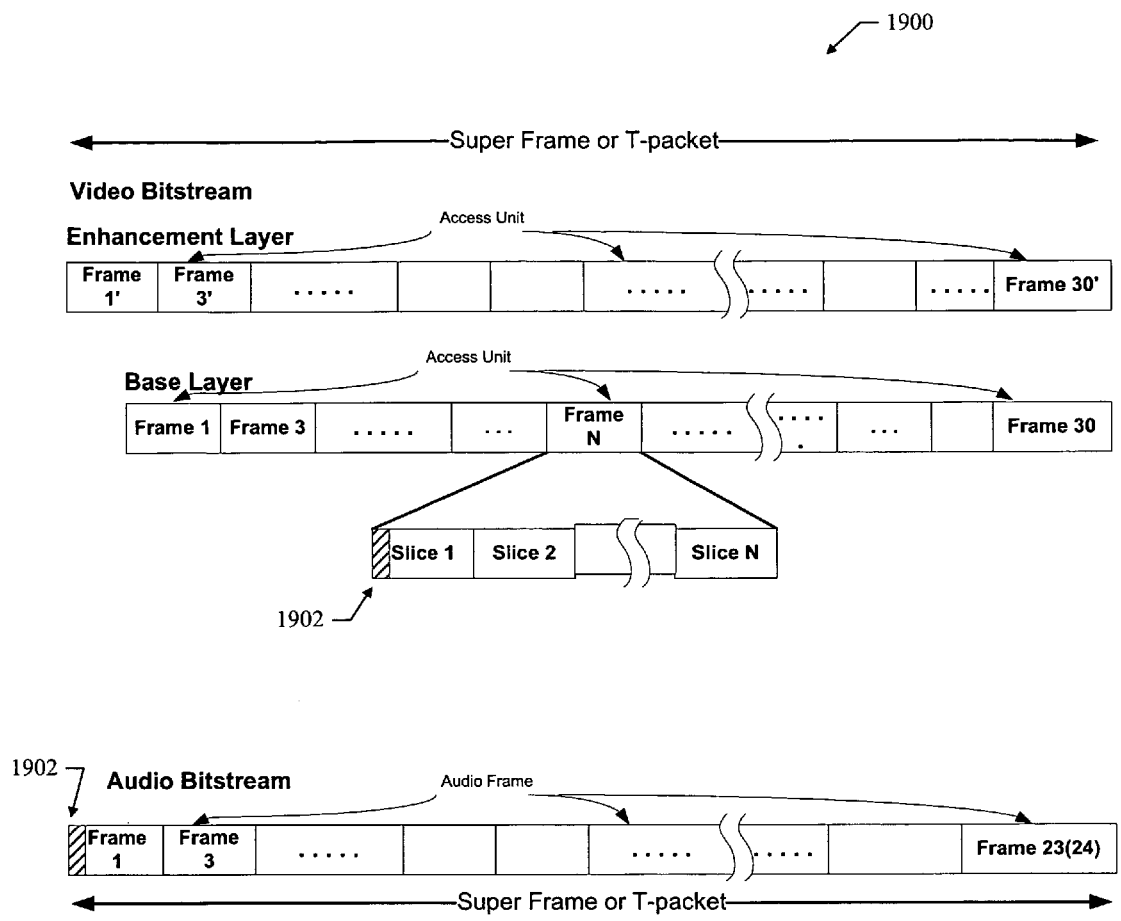
FIG. 19 shows a frame organization for providing video and audio bitstreams for use in a service acquisition system.

FIG. 19 shows a frame organization 1900 for providing video and audio bitstreams for use in a service acquisition system. The frame organization 1900 illustrates frame organization for base and enhancement layer video and a frame organization for audio. In an aspect, a base layer video frame comprises "N" video slices. Additionally, random access points 1902 are provided through independent decoding that is aligned to T-packet boundaries for both video and audio. Furthermore, additional random access points may be provided for error resilience and recovery or for faster channel switching.

It should be noted that the frame organization 1900 represents just one implementation and that other implementations are possible within the scope of the described aspects.

Thus, the various aspects of a service acquisition system operate as described herein to provide the following functions.

a. Provide effective communications, interactions, and understanding between OSI layers with tight coupling that eliminates/reduces jitter and processing buffers at various points thereby reducing latencies. One of the primary advantages is fast channel switching in multimedia mobile broadcasts for example through data packets corresponding to one second of data that flows through the system.

b. Synchronous and asynchronous timing throughout the system with or without a clock (PCR) carried throughout the system.

c. Fast Channel Switching/Acquisition through reduced buffering.

d. Audio is continuous (boxcar) but may not be synchronous.

e. One buffer throughout the system. Minimal de-jitter buffer at the receiver (i.e., on the order of milliseconds) for when the next second of data starts to fill up and before the current second of data is completely consumed.

f. Audio aspects. Since compressed audio frames may or may not divide evenly at one second boundaries, left over information for a current audio frame is sent with the current second (i.e. ahead of time by a few milliseconds). Due to a continuous stream input, the buffer at the receiver appears continuous.

Figure 20:
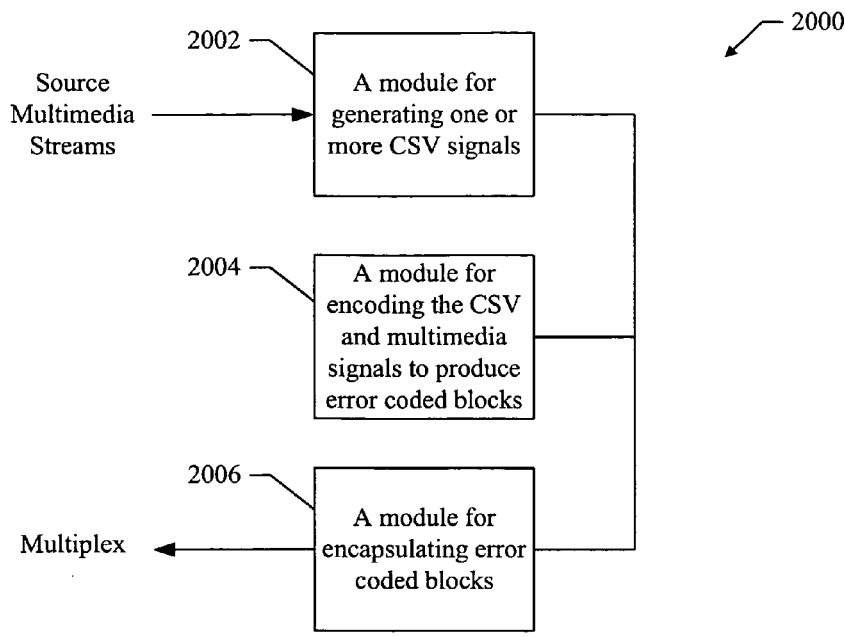
FIG. 20 shows a server for use in aspects of a service acquisition system.

FIG. 20 shows a server 2000 for use in aspects of a service acquisition system. The server 2000 comprises a module (2002) for generating one or more CSV signals, which in an aspect comprises the source encoder 408. The server 2000 also comprises a module (2004) for encoding a CSV signal and multimedia signals to produce error coded blocks, which in an aspect comprises the FEC encoder 414. The server 2000 also comprises a module (2006) for encapsulating error coded blocks, which in an aspect comprises the packer 416. It should be noted that the server 2000 is just one implementation and that other implementations are possible.

Figure 21:
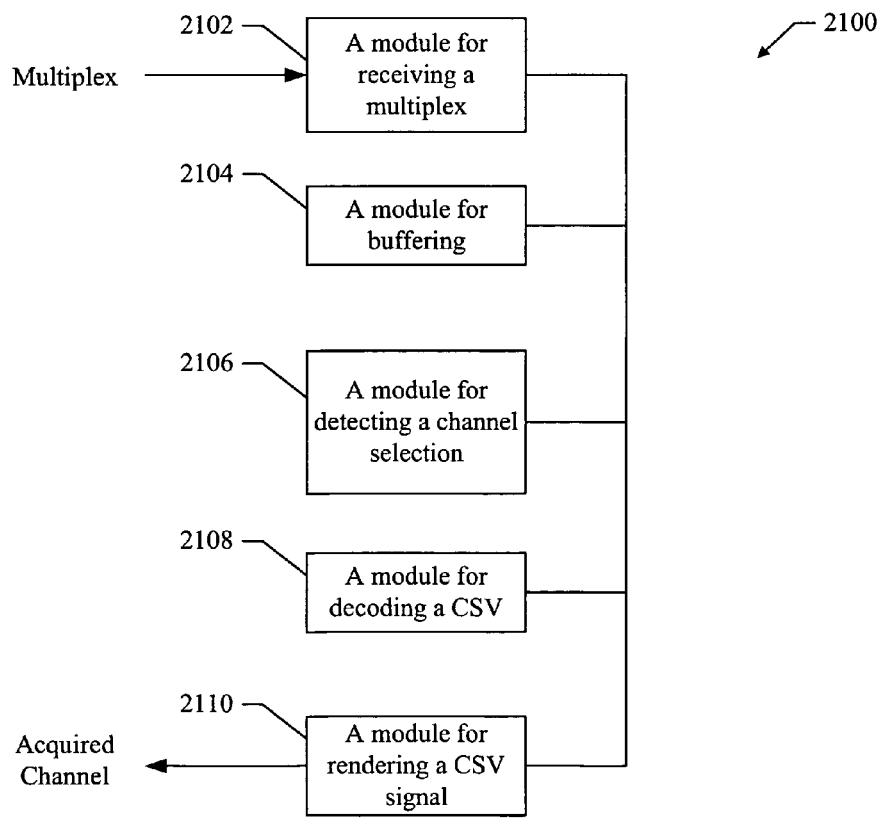
FIG. 21 shows a device for use in aspects of a service acquisition system.

FIG. 21 shows a device 2100 for use in aspects of a service acquisition system. The device 2100 comprises a module (2102) for receiving a multiplex, which in an aspect comprises the receiver 804. The device 2100 also comprises a module (2104) for buffering a multiplex, which in an aspect comprises the buffer 832. The device 2100 also comprises a module (2106) for detecting a channel selection, which in an aspect comprises the tuning logic 818. The device 2100 also comprises a module (2108) for decoding a CSV signal, which in an aspect comprises the un-packer 814. The device 2100 also comprises a module (2110) for rendering a CSV signal, which in an aspect comprises the source decoder 816. It should be noted that the device 2100 is just one implementation and that other implementations are possible.

Figure 22:
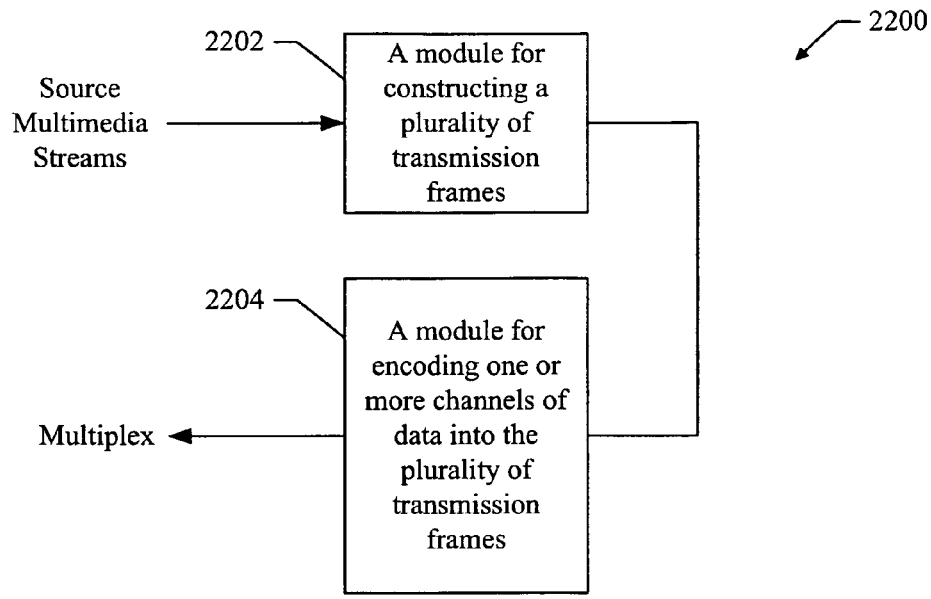
FIG. 22 shows a server for use in aspects of a service acquisition system.

FIG. 22 shows a server 2200 for use in aspects of a service acquisition system. The server 2200 comprises a module (2202) for constructing a plurality of transmission frames, which in an aspect comprises the packer 416. The server 2200 also comprises a module (2204) for encoding one or more channels of data into a transmission frame, which in an aspect comprises the FEC encoder 414. It should be noted that the server 2200 is just one implementation and that other implementations are possible.

Figure 23:
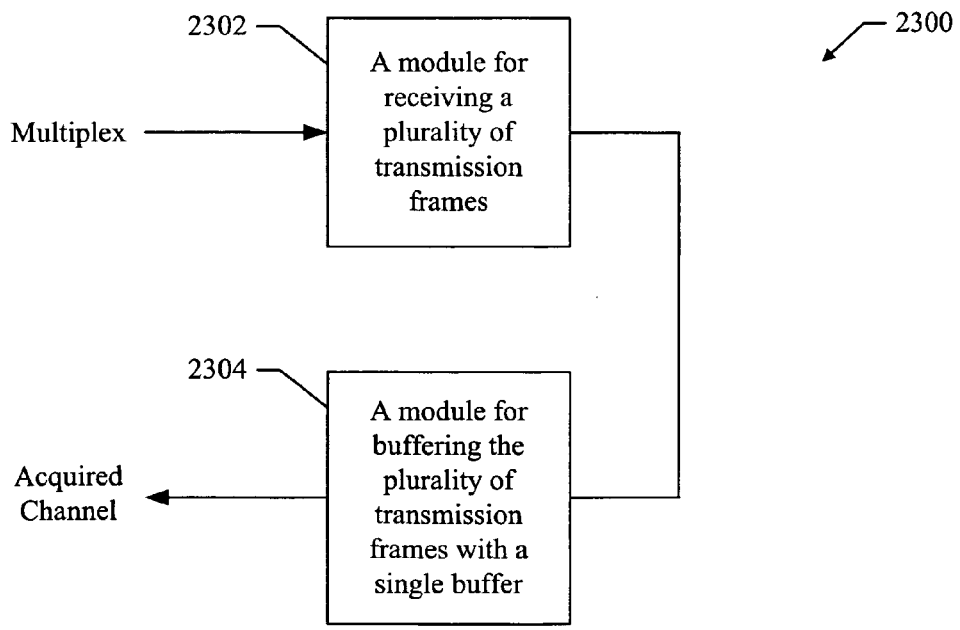
FIG. 23 shows a device for use in aspects of a service acquisition system.

FIG. 23 shows a device 2300 for use in aspects of a service acquisition system. The device 2300 comprises a module (2302) for receiving a plurality of transmission frames, which in an aspect comprises the receiver 804. The device 2300 also comprises a module (2304) for buffering the plurality of transmission frames with a single buffer, which in an aspect comprises the buffer 832. It should be noted that the device 2300 is just one implementation and that other implementations are possible.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while one or more aspects of a service acquisition system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for service acquisition, the method comprising:
   generating one or more channel switch video (CSV) signals associated with one or more multimedia signals, wherein a CSV signal comprises an independently decodable, low-resolution channel switch version of a video signal from an associated multimedia signal, the channel switch version being transmitted periodically to provide random access into a coded video bitstream;
   encoding the CSV and multimedia signals to produce error coded blocks at an encoder, wherein the error coded blocks comprise error coded blocks associated with overhead information and error coded blocks comprising data associated with the one or more multimedia signals;
   pre-interleaving the error coded blocks at a pre-interleaver so the error coded blocks comprising data associated with the one or more multimedia signals are placed contiguously between the error coded blocks associated with overhead information, and further pre-interleaving the error coded blocks at the pre-interleaver so that an error coded block comprising keys needed to decode the error coded blocks comprising data associated with the one or more multimedia signals is placed after the error coded blocks comprising data associated with the one or more multimedia signals are placed; and
   encapsulating the pre-interleaved error coded blocks into a packet of a multiplex signal, wherein said generating comprises generating the one or more CSV signals by sub-sampling in at least one of a spatial or temporal domain.

2. The method of claim 1, wherein said encoding the CSV signals and the multimedia signals comprises encoding the CSV signals and the multimedia signals using forward error correction to produce the error coded data blocks.

3. The method of claim 1, further comprising transmitting the multiplex signal over a data network.

4. An apparatus for service acquisition, the apparatus comprising:
   a source encoder configured to generate one or more channel switch video (CSV) signals associated with one or more multimedia signals, wherein a CSV signal is an independently decodable, low-resolution channel switch version of a video signal from an associated multimedia signal, the channel switch version being transmitted periodically to provide random access into a coded video bitstream;
   an error encoder configured to encode the CSV and multimedia signals to produce error coded blocks, wherein the error coded blocks comprise error coded blocks associated with overhead information and error coded blocks comprising data associated with the one or more multimedia signals;
   a pre-interleaver configured to pre-interleave the error coded blocks so that the error coded blocks comprising data associated with the one or more multimedia signals are placed contiguously between the error coded blocks associated with overhead information, and further pre-interleave the error coded blocks so that an error coded block comprising keys needed to decode the error coded blocks comprising data associated with the one or more multimedia signals is placed after the error coded blocks comprising data associated with the one or more multimedia signals; and
   a packer configured to encapsulate the pre-interleaved error coded blocks into a packet of a multiplex signal, wherein said source encoder is configured to generate the one or more CSV signals by sub-sampling in at least one of a spatial or temporal domain.

5. The apparatus of claim 4, wherein said error encoder is configured to provide forward error correction.

6. The apparatus of claim 4, further comprising a transmitter configured to transmit the multiplex signal over a data network.

7. An apparatus for service acquisition, the apparatus comprising:
   means for generating one or more channel switch video (CSV) signals associated with one or more multimedia signals, wherein a CSV signal is an independently decodable, low-resolution channel switch version of a video signal from an associated multimedia signal, the channel switch version being transmitted periodically to provide random access into a coded video bitstream;

means for encoding the CSV and multimedia signals to produce error coded blocks, wherein the error coded blocks comprise error coded blocks associated with overhead information and error coded blocks comprising data associated with the one or more multimedia signals;

means for pre-interleaving the error coded blocks so that the error coded blocks comprising data associated with the one or more multimedia signals are placed contiguously between the error coded blocks associated with overhead information, and further pre-interleaving the error coded blocks so that an error coded block comprising keys needed to decode the error coded blocks comprising data associated with the one or more multimedia signals is placed after the error coded blocks comprising data associated with the one or more multimedia signals; and means for encapsulating the pre-interleaved error coded blocks into a packet of a multiplex signal, wherein said means for generating comprises means for generating the one or more CSV signals by sub-sampling in at least one of a spatial or temporal domain.

8. The apparatus of claim 7, wherein said means for encoding the CSV signals and the multimedia signals comprises means for encoding the CSV signals and the multimedia signals using forward error correction to produce the error coded data blocks.

9. The apparatus of claim 7, further comprising means for transmitting the multiplex signal over a data network.

10. A non-transitory, machine-readable medium comprising instructions for service acquisition, wherein the instructions upon execution cause a machine to:

generate one or more channel switch video (CSV) signals associated with one or more multimedia signals, wherein a CSV signal is an independently decodable, low-resolution channel switch version of a video signal from an associated multimedia signal, the channel switch version being transmitted periodically to provide random access into a coded video bitstream;

encode the CSV and multimedia signals to produce error coded blocks, wherein the error coded blocks comprise error coded blocks associated with overhead information and error coded blocks comprising data associated with the one or more multimedia signals;

pre-interleave the error coded blocks so the error coded blocks comprising data associated with the one or more multimedia signals are placed contiguously between the error coded blocks associated with overhead information, and further pre-interleave the error coded blocks so that an error coded block comprising keys needed to decode the error coded blocks comprising data associated with the one or more multimedia signals is placed after the error coded blocks comprising data associated with the one or more multimedia signals; and encapsulate the pre-interleaved error coded blocks into a packet of a multiplex signal, wherein the instructions for generating cause the machine to generate the one or more CSV signals by sub-sampling in at least one of a spatial or temporal domain.

11. The non-transitory, machine-readable medium of claim 10, wherein said instructions for encoding the CSV signals and the multimedia signals further cause the machine to encode the CSV signals and the multimedia signals using forward error correction to produce the error coded data blocks.

12. The non-transitory, machine-readable medium of claim 10, wherein the instructions further cause the machine to transmit the multiplex signal over a data network.

13. At least one processor for service acquisition, the at least one processor being configured to:

generate one or more channel switch video (CSV) signals associated with one or more multimedia signals, wherein a CSV signal is an independently decodable, low-resolution channel switch version of a video signal from an associated multimedia signal, the channel switch version being transmitted periodically to provide random access into a coded video bitstream;

encode the CSV and multimedia signals to produce error coded blocks, wherein the error coded blocks comprise error coded blocks associated with overhead information and error coded blocks comprising data associated with the one or more multimedia signals;

pre-interleave the error coded blocks so that the error coded blocks comprising data associated with the one or more multimedia signals are placed contiguously between the error coded blocks associated with overhead information, and further pre-interleave the error coded blocks so that an error coded block comprising keys needed to decode the error coded blocks comprising data associated with the one or more multimedia signals is placed after the error coded blocks comprising data associated with the one or more multimedia signals; and encapsulate the pre-interleaved error coded blocks into a packet of a multiplex signal, wherein being configured to generate comprises being configured to generate the one or more CSV signals by sub-sampling in at least one of a spatial or temporal domain.

14. The at least one processor of claim 13, wherein being configured to encode the CSV signals and the multimedia signals comprises being configured to encode the CSV signals and the multimedia signals using forward error correction to produce the error coded data blocks.

15. The at least one processor of claim 13, being further configured to transmit the multiplex signal over a data network.

16. A method for service acquisition, the method comprising:

receiving a multiplex signal associated with a plurality of channels;

detecting a selection of one of the channels;

decoding a channel switch video (CSV) signal associated with the selected channel at a decoder;

decoding the multiplex signal at the decoder to produce a packet comprising error coded data blocks and error coded information blocks, the error coded data blocks being placed contiguously between the error coded information blocks, and an error coded information block comprising keys needed to decode the error coded data blocks being placed after the error coded data blocks;

de-interleaving the error coded data blocks and the error coded information blocks at a de-interleaver; and rendering the CSV signal, wherein:

the CSV signal comprises an independently decodable, low-resolution channel switch version of a video for the selected channel, the channel switch version being transmitted periodically to provide random access into a coded video bitstream, and decoding the CSV comprises decoding the CSV signal produced by sub-sampling in at least one of a spatial or temporal domain.

17. The method of claim 16, wherein said receiving comprises receiving the multiplex signal over a data network.

18. The method of claim 15, wherein said detection is based on user input.

19. The method of claim 16, further comprising decoding the selected channel.

20. An apparatus for service acquisition, the apparatus comprising:
   a receiver configured to receive a multiplex signal associated with a plurality of channels;
   selection logic configured to detect a selection of one of the channels;
   an un-packer configured to decode a channel switch video (CSV) signal associated with the selected channel and decode the multiplex signal to produce a packet comprising error coded data blocks and error coded information blocks, the error coded data blocks being placed contiguously between the error coded information blocks, and an error coded information block comprising keys needed to decode the error coded data blocks being placed after the error coded data blocks;
   a de-interleaver to de-interleave the error coded data blocks and the error coded information blocks; and
   a source decoder configured to render the CSV signal, wherein the CSV signal comprises an independently decodable, low-resolution channel switch version of a video for the selected channel, the channel switch version being transmitted periodically to provide random access into a coded video bitstream, wherein the CSV signal is generated by sub-sampling in at least one of a spatial or temporal domain.

21. The apparatus of claim 20, wherein said receiver is configured to receive the multiplex signal over a data network.

22. The apparatus of claim 20, wherein said selection logic is configured to detect the selection of the channel based on user input.

23. The apparatus of claim 20, wherein the source decoder is configured to decode the selected channel.

24. An apparatus for service acquisition, the apparatus comprising:
   means for receiving a multiplex signal associated with a plurality of channels;
   means for detecting a selection of one of the channels;
   means for decoding a channel switch video (CSV) signal associated with the selected channel;
   means for decoding the multiplex signal to produce a packet comprising error coded data blocks and error coded information blocks, the error coded data blocks being placed contiguously between the error coded information blocks, and an error coded information block comprising keys needed to decode the error coded data blocks being placed after the error coded data blocks;
   means for de-interleaving the error coded data blocks and the error coded information blocks; and
   means for rendering the CSV signal, wherein the CSV signal comprises an independently decodable, low-resolution channel switch version of a video for the selected channel, the channel switch version being transmitted periodically to provide random access into a coded video bitstream, wherein the CSV signal is generated by sub-sampling in at least one of a spatial or temporal domain.

25. The apparatus of claim 24, wherein said means for receiving comprises means for receiving the multiplex signal over a data network.

26. The apparatus of claim 24, wherein said means for detecting comprises means for detecting the selected channel based on user input.

27. The apparatus of claim 24, further comprising means for decoding the selected channel.

28. A non-transitory, machine-readable medium, comprising instructions for service acquisition, wherein the instructions upon execution cause a machine to:
   receive a multiplex signal associated with a plurality of channels;
   detect a selection of one of the channels;
   decode a channel switch video (CSV) signal associated with the selected channel;
   decode the multiplex signal to produce a packet comprising error coded data blocks and error coded information blocks, the error coded data blocks being placed contiguously between the error coded information blocks, and an error coded information block comprising keys needed to decode the error coded data blocks being placed after the error coded data blocks;
   de-interleave the error coded data blocks and the error coded information blocks; and
   render the CSV signal, wherein:
      the CSV signal comprises an independently decodable, low-resolution channel switch version of a video for the selected channel, the channel switch version being transmitted periodically to provide random access into a coded video bitstream, and
      the CSV signal is generated by sub-sampling in at least one of a spatial or temporal domain.

29. The non-transitory, machine-readable medium of claim 28, wherein the instructions for receiving further cause the machine to receive the multiplex signal over a data network.

30. The non-transitory, machine-readable medium of claim 28, wherein the instructions for detecting further cause the machine to detect the selected channel based on user input.

31. The non-transitory, machine-readable medium of claim 28, wherein the instructions further cause the machine to decode the selected channel.

32. At least one processor for service acquisition, the at least one processor being configured to:
   receive a multiplex signal associated with a plurality of channels;
   detect a selection of one of the channels;
   decode a channel switch video (CSV) signal associated with the selected channel;
   decode the multiplex signal to produce a packet comprising error coded data blocks and error coded information blocks, the error coded data blocks being placed contiguously between the error coded information blocks, and an error coded information block comprising keys needed to decode the error coded data blocks being placed after all the error coded data blocks;
   de-interleave the error coded data blocks and the error coded information blocks; and
   render the CSV signal, wherein:
      the CSV signal comprises an independently decodable, low-resolution channel switch version of a video for the selected channel, the channel switch version being transmitted periodically to provide random access into a coded video bitstream, and
      wherein the CSV signal is generated by sub-sampling in at least one of a spatial or temporal domain.

33. The at least one processor of claim 32, wherein being configured to receive comprises being configured to receive the multiplex signal over a data network.

34. The at least one processor of claim 32, wherein being configured to detect comprises being configured to detect the selected channel based on user input.

35. The at least one processor of claim 32, being further configured to decode the selected channel.

36. A method for service acquisition, the method comprising:
constructing a plurality of transmission frames wherein each transmission frame is associated with a selected time interval; and
encoding data associated with one or more channels into the plurality of transmission frames at an encoder by pre-interleaving padding octets, error coded data blocks and error coded information blocks associated with the one or more channels of data so that the error coded data blocks are placed after the padding octets and contiguously between the error coded information blocks, and further by pre-interleaving the error coded data blocks and error coded information blocks in a given transmission frame of the plurality of transmission frames so that an error coded information block comprising keys needed to decode the error coded data blocks is placed after all the error coded data blocks in the given transmission frame, wherein:
selected data is encoded into predetermined transmission frames so that channel jitter can be absorbed using a single buffer associated with a selected time duration, and
encoding comprises generating one or more CSV signals by sub-sampling in at least one of a spatial or temporal domain.

37. The method of claim 36, wherein encoding comprises encoding by using forward error correction encoding.

38. The method of claim 36, wherein the one or more channels of data comprise one or more channel switch video (CSV) signals associated with one or more multimedia signals, wherein the CSV signals comprise independently decodable, low-resolution versions of video signals for the one or more multimedia signals.

39. An apparatus for service acquisition, the apparatus comprising:
means for constructing a plurality of transmission frames, wherein each transmission frame is associated with a selected time interval; and
means for encoding data associated with one or more channels into the plurality of transmission frames by pre-interleaving padding octets, error coded data blocks and error coded information blocks associated with the one or more channels of data so that the error coded data blocks are placed after the padding octets and contiguously between the error coded information blocks, and further by pre-interleaving the error coded data blocks and error coded information blocks in a given transmission frame of the plurality of transmission frames so that an error coded information block comprising keys needed to decode the error coded data blocks is placed after all the error coded data blocks in the given transmission frame, wherein:
selected data is encoded into predetermined transmission frames so that channel jitter can be absorbed using a single buffer associated with a selected time duration, and
means for encoding comprises means for generating one or more channel switch video (CSV) signals to comprise at least one of a temporally or spatially sub-sampled lower resolution video signal associated with the one or more multimedia signals.

40. The apparatus of claim 39, wherein means for encoding comprises means for encoding using forward error correction encoding.

41. The apparatus of claim 39, wherein:
the CSV signals are associated with one or more multimedia signals, and
the CSV signals comprise independently decodable, low-resolution versions of video signals for the one or more multimedia signal.

42. An apparatus for service acquisition, the apparatus comprising:
a packer configured to construct a plurality of transmission frames wherein each transmission frame is associated with a selected time interval; and
an encoder configured to encode data associated with one or more channels into the plurality of transmission frames by pre-interleaving padding octets, error coded data blocks and error coded information blocks associated with the one or more channels of data so that the error coded data blocks are placed after the padding octets and contiguously between the error coded information blocks, and further by pre-interleaving the error coded data blocks and error coded information blocks in a given transmission frame of the plurality of transmission frames so that an error coded information block comprising keys needed to decode the error coded data blocks is placed after all the error coded data blocks in the given transmission frame, wherein selected data is encoded into predetermined transmission frames so that channel jitter can be absorbed using a single buffer associated with a selected time duration, and wherein one or more channel switch video (CSV) signals associated with one or more multimedia signals are generated by sub-sampling in at least one of a spatial or temporal domain.

43. A non-transitory, machine-readable medium, comprising instructions for service acquisition, wherein the instructions upon execution cause a machine to:
construct a plurality of transmission frames, wherein each transmission frame is associated with a selected time interval; and
encode data associated with one or more channels into the plurality of transmission frames by pre-interleaving padding octets, error coded data blocks and error coded information blocks associated with the one or more channels of data so that the error coded data blocks are placed after the padding octets and contiguously between the error coded information blocks, and further by pre-interleaving the error coded data blocks and error coded information blocks in a given transmission frame of the plurality of transmission frames so that an error coded information block comprising keys needed to decode the error coded data blocks is placed after all the error coded data blocks in the given transmission frame, wherein selected data is encoded into predetermined transmission frames so that channel jitter can be absorbed using a single buffer associated with a selected time duration, and wherein encoding comprises generating one or more channel switch video (CSV) signals by sub-sampling in at least one of a spatial or temporal domain.

44. At least one processor for service acquisition, the at least one processor being configured to:

construct a plurality of transmission frames, wherein each transmission frame is associated with a selected time interval; and encode data associated with one or more channels into the plurality of transmission frames by pre-interleaving padding octets, error coded data blocks and error coded information blocks associated with the one or more channels of data so that the error coded data blocks are placed after the padding octets and contiguously between the error coded information blocks, and further by pre-interleaving the error coded data blocks and error coded information blocks in a given transmission frame of the plurality of transmission frames so that an error coded information block comprising keys needed to decode the error coded data blocks is placed after all the error coded data blocks in the given transmission frame, wherein selected data is encoded into predetermined transmission frames so that channel jitter can be absorbed using a single buffer associated with a selected time duration, and wherein encoding comprises generating one or more channel switch video (CSV) signals by sub-sampling in at least one of a spatial or temporal domain.

45. A method for service acquisition, the method comprising:

receiving a plurality of transmission frames, wherein each transmission frame is associated with a selected time interval and comprises data associated with one or more channels, and wherein selected data is encoded into predetermined transmission frames as padding octets, error coded data blocks and error coded information blocks so that the error coded data blocks are placed after the padding octets and placed contiguously between error coded information blocks, and the selected data is further encoded so that an error coded information block comprising keys needed to decode the error coded data blocks is placed after all the error coded data blocks in the predetermined transmission frames;

buffering the plurality of transmission frames at a demodulator with a single buffer associated with a selected time duration wherein channel jitter associated with the one or more channels is absorbed; and decoding the one or more channels of data using forward error correction decoding, wherein:
the one or more channels of data comprise one or more channel switch video (CSV) signals associated with one or more multimedia signals, wherein the CSV signals comprise independently decodable, low-resolution versions of video signals for the one or more multimedia signal; and
decoding comprises decoding the one or more CSV signals produced by sub-sampling in at least one of a spatial or temporal domain.

46. The method of claim 45, wherein decoding comprises de-interleaving the error coded data blocks and error coded information blocks.

47. An apparatus for service acquisition, the apparatus comprising:

means for receiving a plurality of transmission frames, wherein each transmission frame is associated with a selected time interval and comprises data associated with one or more channels, and wherein selected data is encoded into predetermined transmission frames as padding octets, error coded data blocks and error coded information blocks so that the error coded data blocks are placed after the padding octets and placed contiguously between error coded information blocks, and the selected data is further encoded so that an error coded information block comprising keys needed to decode the error coded data blocks is placed after all the error coded data blocks in the predetermined transmission frames; and means for buffering the plurality of transmission frames with a single buffer associated with a selected time duration, wherein:
channel jitter associated with the one or more channels is absorbed; and
means for decoding comprises means for decoding one or more channel switch video (CSV) signals produced by sub-sampling in at least one of a spatial or temporal domain.

48. The apparatus of claim 47, comprising means for decoding the one or more channels of data using forward error correction decoding.

49. The apparatus of claim 48, wherein:
the CSV signals are associated with one or more multimedia signals, and
the CSV signals comprise independently decodable, low-resolution versions of video signals for the one or more multimedia signal.

50. The apparatus of claim 49, wherein means for decoding comprises means for de-interleaving the error coded data blocks and error coded information blocks.

51. An apparatus for service acquisition, the apparatus comprising:

a receiver configured to receive a plurality of transmission frames, wherein each transmission frame is associated with a selected time interval and comprises data associated with one or more channels, and wherein selected data is encoded into predetermined transmission frames as padding octets, error coded data blocks and error coded information blocks so that the error coded data blocks are placed after the padding octets and placed contiguously between error coded information blocks, and the selected data is further encoded so that an error coded information block comprising keys needed to decode the error coded data blocks is placed after all the error coded data blocks in the predetermined transmission frames; and a demodulator configured to buffer the plurality of transmission frames with a single buffer associated with a selected time duration, wherein:
channel jitter associated with the one or more channels is absorbed; and
encoding comprises generating one or more channel switch video (CSV) signals by sub-sampling in at least one of a spatial or temporal domain.

52. A non-transitory machine-readable medium, comprising instructions for service acquisition, wherein the instructions upon execution cause a machine to:

receive a plurality of transmission frames, wherein each transmission frame is associated with a selected time interval and comprises data associated with one or more channels, and wherein selected data is encoded into predetermined transmission frames as padding octets, error coded data blocks and error coded information blocks so that the error coded data blocks are placed after the padding octets and placed contiguously between error coded information blocks, and the selected data is further encoded so that an error coded information block comprising keys needed to decode the error coded data blocks is placed after all the error coded data blocks in the predetermined transmission frames; and buffer the plurality of transmission frames with a single buffer associated with a selected time duration, wherein:
　　channel jitter associated with the one or more channels is absorbed; and
　　encoding comprises generating one or more CSV signals by sub-sampling in at least one of a spatial or temporal domain.

53. At least one processor for service acquisition, the at least one processor being configured to:
　receive a plurality of transmission frames, wherein each transmission frame is associated with a selected time interval and comprises data associated with one or more channels, and wherein selected data is encoded into predetermined transmission frames as padding octets, error coded data blocks and error coded information blocks so that the error coded data blocks are placed after the padding octets and placed contiguously between error coded information blocks, and the selected data is further encoded so that an error coded information block comprising keys needed to decode the error coded data blocks is placed after all the error coded data blocks in the predetermined transmission frames; and
　buffer the plurality of transmission frames with a single buffer associated with a selected time duration, wherein:
　　channel jitter associated with the one or more channels is absorbed; and
　　encoding comprises generating one or more CSV signals by sub-sampling in at least one of a spatial or temporal domain.

* * * * *